United States Patent
Masuyama et al.

(10) Patent No.: US 8,102,450 B2
(45) Date of Patent: Jan. 24, 2012

(54) SOLID-STATE IMAGING DEVICE, IMAGING APPARATUS AND DRIVING METHOD FOR THE SAME

(75) Inventors: Masayuki Masuyama, Kyoto (JP); Kunihiko Hara, Osaka (JP); Masashi Murakami, Kyoto (JP); Shinsuke Nezaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 12/089,289

(22) PCT Filed: Aug. 28, 2006

(86) PCT No.: PCT/JP2006/317393
§ 371 (c)(1),
(2), (4) Date: Apr. 4, 2008

(87) PCT Pub. No.: WO2007/043252
PCT Pub. Date: Apr. 19, 2007

(65) Prior Publication Data
US 2009/0040346 A1    Feb. 12, 2009

(30) Foreign Application Priority Data
Oct. 5, 2005    (JP) .................................. 2005-292252

(51) Int. Cl.
H04N 3/14    (2006.01)
H01L 27/00    (2006.01)
H01L 27/146    (2006.01)
H01L 31/062    (2006.01)
H01J 40/14    (2006.01)

(52) U.S. Cl. ........ 348/308; 348/297; 348/299; 348/296; 348/294; 348/301; 250/208.1; 250/214 R; 257/258; 257/291; 257/72

(58) Field of Classification Search .......... 348/294–324; 250/208.1, 214.1, 214 R; 257/59, 72, 258, 257/291, 443
See application file for complete search history.

(56) References Cited

U.S. PATENT DOCUMENTS

| | | | |
|---|---|---|---|
| 6,130,420 A * | 10/2000 | Tanaka et al. | 250/208.1 |
| 6,972,791 B1 * | 12/2005 | Yomeyama | 348/230.1 |
| 7,782,370 B2 * | 8/2010 | Sugawara et al. | 348/230.1 |
| 2002/0097330 A1 * | 7/2002 | Spears et al. | 348/311 |

FOREIGN PATENT DOCUMENTS

| | | |
|---|---|---|
| EP | 1 227 664 A1 | 7/2002 |
| JP | 2000-350103 | 12/2000 |
| JP | 2000350103 A * | 12/2000 |

* cited by examiner

*Primary Examiner* — Lin Ye
*Assistant Examiner* — Marly Camargo
(74) *Attorney, Agent, or Firm* — McDermott Will & Emery LLP

(57) ABSTRACT

A solid-state imaging device includes first-group pixels 41, second-group pixels 42 skipped during thinning drive, and a scanning section 13. The scanning section 13 drives each of the first-group pixels 41 to perform read operation of outputting the output signal and initializing the amount of the signal charge accumulated in the photoelectric conversion element to a first level, and also drives each of the second-group pixels 42 to perform discharge operation of initializing the amount of the signal charge accumulated in the photoelectric conversion element to a second level that is higher than the first level and lower than a saturation signal level of the photoelectric conversion element 12.

10 Claims, 21 Drawing Sheets

SOLID-STATE IMAGING DEVICE, IMAGING APPARATUS AND DRIVING METHOD FOR THE SAME

This application is the U.S. National Phase under 35 U.S.C. §371 of International Application No. PCT/JP2006/317393, filed on Aug. 28, 2006, which in turn claims the benefit of Japanese Application No. 2005-292252, filed on Oct. 5, 2005, the disclosures of which Applications are incorporated by reference herein.

TECHNICAL FIELD

The present invention relates to a solid-state imaging device, an imaging apparatus and a driving method for such a device, and more particularly, to a solid-state imaging device and an imaging apparatus for high-speed moving-picture imaging, and a driving method for such a device.

BACKGROUND ART

In recent years, MOS sensors operable at low voltage have attracted attention in their application to portable equipment and the like. A conventional problem of MOS sensors that the resultant image quality is inferior compared to CCD devices is becoming improved.

To achieve both high-definition still-picture imaging and high-speed moving-picture imaging with one MOS sensor, a solid-state imaging device that performs thinning drive in which pixels in the MOS sensor are thinned in reading has been developed.

In a solid-state imaging device made of a MOS sensor, which can read only signals from pixels to which a selection pulse has been supplied, the thinning drive can be realized by supplying no selection pulse to pixels that are to be skipped in reading.

However, photoelectric conversion is performed also for skipped pixels. Therefore, if the thinning drive is realized by simply not selecting a pixel, a signal overflowing from a photoelectric conversion element of the skipped pixel may flow into an adjacent pixel, possibly causing generation of a false signal.

To prevent the generation of a false signal, a method is proposed in which charge in the photoelectric conversion element of a pixel to be skipped is released to a power supply terminal by putting a reset switch of the pixel to be skipped in the active state at all times (see Japanese Laid-Open Patent Publication No. 2000-350103, for example).

With the operation described above, it is possible to prevent such an occurrence that charge accumulated in the photoelectric conversion element of a pixel of which read is skipped during the thinning drive may be saturated and flow into an adjacent photoelectric conversion element causing generation of a false signal. In this way, a high-quality image hardly causing smearing, blooming, color mixing or the like can be obtained.

However, the conventional solid-state imaging device and drive method for such a device described above have the following problem.

In general, a solid-state imaging device has a plurality of n-type semiconductor layers in a p-well formed over the entire imaging region, in which each pn junction constitutes a diode. Contacts for grounding the p-well to the ground potential are not placed inside the imaging region to maximize the size of photodiodes, and the p-well is only grounded via contacts and the like in a region surrounding the imaging region. In this case, however, the potential of the p-well is not sufficiently fixed in the center of the imaging region. For this reason, when selection switch pulses and reset switch pulses are applied to signal lines, the potential of the p-well varies due to capacitance coupling between the signal lines and the p-well, and a fixed time must be secured until the potential of the p-well is stabilized. Thus, since it takes time to perform read and reset operation, a higher frame rate is unobtainable even though pixels are thinned for reading.

In view of the above, an object of the present invention is providing a solid-state imaging device having a high frame rate in which the potential of the p-well is prevented from varying during thinning drive and thus the read and reset operation is shortened.

DISCLOSURE OF THE INVENTION

To attain the object described above, in the solid-state imaging device of present invention, charge is left behind in photoelectric conversion elements of pixels of which read are skipped to give incomplete discharge.

The solid-state imaging device of the present invention includes: a plurality of first-group pixels arranged in a matrix in an imaging region of a semiconductor substrate, each of the pixels including a photoelectric conversion element for converting a light signal to signal charge and accumulating the charge, an initializing portion for initializing the signal charge accumulated in the photoelectric conversion element, and an output portion for outputting an output signal responsive to the signal charge accumulated in the photoelectric conversion element; a plurality of second-group pixels arranged in a matrix in the imaging region so as to have rows different from those for the first-group pixels, each of the pixels including the photoelectric conversion element, the initializing portion and the output portion, read of the second-group pixels being skipped during thinning drive; and a scanning section for permitting each of the first-group pixels to perform read operation of outputting the output signal and initializing the amount of the signal charge accumulated in the photoelectric conversion element to a first level, and also permitting each of the second-group pixels to perform discharge operation of initializing the amount of the signal charge accumulated in the photoelectric conversion element to a second level, the second level being higher than the first level and lower than a saturation signal level of the photoelectric conversion element.

According to the solid-state imaging device of the present invention, not only the problem that charge in a second-group pixel to be skipped overflows causing a false signal can be prevented, but also the variation in the potential of the p-well due to charge left behind in the photoelectric conversion element can be suppressed. Therefore, the read and reset time can be shortened, and thus a solid-state imaging device operating at high speed can be implemented.

In the solid-state imaging device of the present invention, preferably, each of the first-group pixels and the second-group pixels has a floating diffusion to which the signal charge accumulated in the photoelectric conversion element is transferred, and the initializing portion has a transfer transistor electrically connected between the photoelectric conversion element and the floating diffusion. Also, the initializing portion may have a reset transistor connected between the photoelectric conversion element and power supply.

In the solid-state imaging device of the present invention, preferably, the scanning section generates a first drive pulse for driving the initializing portion of each of the first-group pixels and a second drive pulse for driving the initializing portion of each of the second-group pixels, and the pulse width of the second drive pulse is smaller than the pulse width of the first drive pulse. With this arrangement, it is ensured that charge is left behind in the photoelectric conversion elements of the second-group pixels.

In the solid-state imaging device of the present invention, preferably, the scanning section generates the first drive pulse and the second drive pulse based on a reference clock, and the pulse width of the second drive pulse is the smallest pulse width that can be generated based on the reference clock. With this arrangement, high-speed thinning drive can be ensured.

In the solid-state imaging device of the present invention, preferably, the scanning section generates a first drive pulse for driving the initializing portion of each of the first-group pixels and a second drive pulse for driving the initializing portion of each of the second-group pixels, and the pulse height of the second drive pulse is lower than the pulse height of the first drive pulse. With this arrangement, also, charge can be left behind in the photoelectric conversion elements of the second-group pixels.

In the solid-state imaging device of the present invention, preferably, the initializing portion has a transistor of which source is connected to the photoelectric conversion element, and the voltage applied to a drain of the transistor in the discharge operation is lower than the voltage applied to the drain of the transistor in the read operation. With this arrangement, also, charge can be left behind in the photoelectric conversion elements of the second-group pixels.

The solid-state imaging device of the present invention preferably further includes holding means for holding the drive signal for a predetermined time in the discharge operation. With this arrangement, the timing pulse can be easily supplied, and this ensures release of charge from the photoelectric conversion elements of the second-group pixels.

In the above case, preferably, the scanning section generates a first drive pulse for driving the initializing portion of each of the first-group pixels and a second drive pulse for driving the initializing portion of each of the second-group pixels, and the pulse height of the second drive pulse is lower than the pulse height of the first drive pulse.

In the solid-state imaging device of the present invention, preferably, the scanning section drives the first-group pixels to perform electronic shutter operation for limiting the time during which the photoelectric conversion element of each of the first-group pixels accumulates the signal charge, and when one first-group pixel among the plurality of first-group pixels performs the electronic shutter operation, the scanning section drives a second-group pixel at least adjacent to the one first-group pixel among the plurality of second-group pixels to perform the discharge operation.

In the solid-state imaging device of the present invention, preferably, the scanning section drives the first-group pixels to perform electronic shutter operation for limiting the time during which the photoelectric conversion element of each of the first-group pixels accumulates the signal charge, and when first-group pixels lined in one row among the plurality of first-group pixels perform the electronic shutter operation, the scanning section drives second-group pixels lined in a row at least adjacent to the first-group pixels lined in the one row among the plurality of second-group pixels to perform the discharge operation.

The imaging apparatus of the present invention includes: a solid-state imaging device of the present invention; an optical system for allowing light to be incident to the solid-state imaging device; a control section for outputting a control signal for controlling operation of the solid-state imaging device; and a signal processing circuit for processing an output signal from the solid-state imaging device and outputting the results as image data.

According to the imaging apparatus of the present invention, an imaging apparatus that is small in smearing, blooming, color mixture and the like that may be caused due to a false signal and high in frame rate can be implemented.

The imaging apparatus of the present invention preferably further includes a shutter for shutting light from being incident to the solid-state imaging device.

The imaging apparatus of the present invention preferably further includes a monitor screen for monitoring the image data.

In the imaging apparatus of the present invention, preferably, at least one of the control section and the signal processing circuit is placed on the semiconductor substrate of the solid-state imaging device.

The drive method of the present invention is a drive method for a solid-state imaging device including a plurality of first-group pixels and a plurality of second-group pixels, arranged in a matrix in an imaging region of a semiconductor substrate, each of the pixels including a photoelectric conversion element for converting a light signal to signal charge and accumulating the charge, an initializing portion for initializing the signal charge accumulated in the photoelectric conversion element, and an output portion for outputting an output signal responsive to the signal charge accumulated in the photoelectric conversion element. The drive method includes the steps of: (a) driving the output portion and the initializing portion of each of the first-group pixels to allow the pixel to output the output signal and initialize the amount of the signal charge accumulated in the photoelectric conversion element to a first level; and (b) driving the initializing portion of each of the second-group pixels to initialize the amount of the signal charge accumulated in the photoelectric conversion element to a second level that is higher than the first level and lower than a saturation signal level of the photoelectric conversion element.

According to the drive method for a solid-state imaging device of the present invention, it is possible to suppress occurrence of smearing, blooming, color mixture and the like due to overflowing of charge from the photoelectric conversion element of each of the second-group pixels during thinning drive of thinning the second-group pixels. Moreover, since the potential of the p-well is stabilized with charge left behind in the photoelectric conversion elements, high-speed operation can be attained.

In the drive method of the present invention, preferably, the step (a) includes the step of supplying a first drive pulse to the initializing portion, and the step (b) includes the step of supplying a second drive pulse that is smaller in pulse width than the first drive pulse.

In the drive method of the present invention, preferably, the step (a) includes the step of supplying a first drive pulse to the initializing portion, and the step (b) includes the step of supplying a second drive pulse that is lower in pulse height than the first drive pulse.

In the drive method of the present invention, preferably, the initializing portion has a floating diffusion for holding charge and a transfer transistor for transferring charge accumulated in the photoelectric conversion element to the floating diffusion, the step (a) includes the step of driving the transfer transistor after setting the potential of the floating diffusion at a first potential that is a potential of power supply for driving the first-group pixels, and the step (b) includes the step of driving the transfer transistor after setting the potential of the floating diffusion at a second potential that is higher than a ground potential and lower than the first potential.

In the above case, preferably, in the step (a), the transfer transistor is driven with a first drive pulse, and in the step (b), the transfer transistor is driven with a second drive pulse that is larger in pulse width than the first drive pulse.

In the drive method of the present invention, preferably, the initializing portion has a reset transistor connected between the photoelectric conversion element and power supply, the step (a) includes the step of driving the reset transistor after setting the potential of the power supply at a first potential that is a high-level potential for driving the first-group pixels, and the step (b) includes the step of driving the reset transistor after setting the potential of the power supply at a second potential that is higher than a ground potential and lower than the first potential.

In the above case, preferably, in the step (a), the reset transistor is driven with a first drive pulse, and in the step (b), the reset transistor is driven with a second drive pulse that is larger in pulse width than the first drive pulse.

The drive method of the present invention preferably further includes the step of: (c) driving the initializing portion of each of the first-group pixels in a first row prior to the step (a) to initialize the amount of the signal charge accumulated in the photoelectric element to the first level, wherein the step (b) is performed in synchronization with the steps (a) and (c)

With this arrangement, the first-group pixels perform electronic shutter operation of limiting the time during which charge is accumulated in the photoelectric conversion elements to a fixed time. As for the second-group pixels skipped during thinning drive, also, the time during which charge is accumulated in the photoelectric conversion elements is made roughly the same as the time of the electronic shutter operation of the first-group pixels. Therefore, overflowing of charge from the photoelectric conversion elements of the second-group pixels can be prevented.

Thus, according to the present invention, a solid-state imaging device having a high frame rate in which the potential of the p-well is prevented from varying during thinning drive and thus the read and reset operation is shortened can be implemented.

BRIEF DESCRIPTION OF THE DRAWINGS

FIGS. 22A to 22C are charts showing thinning drive of the solid-state imaging device of Embodiment 5 and a conventional solid-state imaging device for comparison, in which FIG. 22A shows the case of thinning drive in Embodiment 5 and the conventional thinning drive under low illumination, FIG. 22B shows the case of the conventional thinning drive under high illumination, and FIG. 22C shows the case of the thinning drive in Embodiment 5 under high illumination.

DESCRIPTION OF REFERENCE NUMERALS

Figure 1:
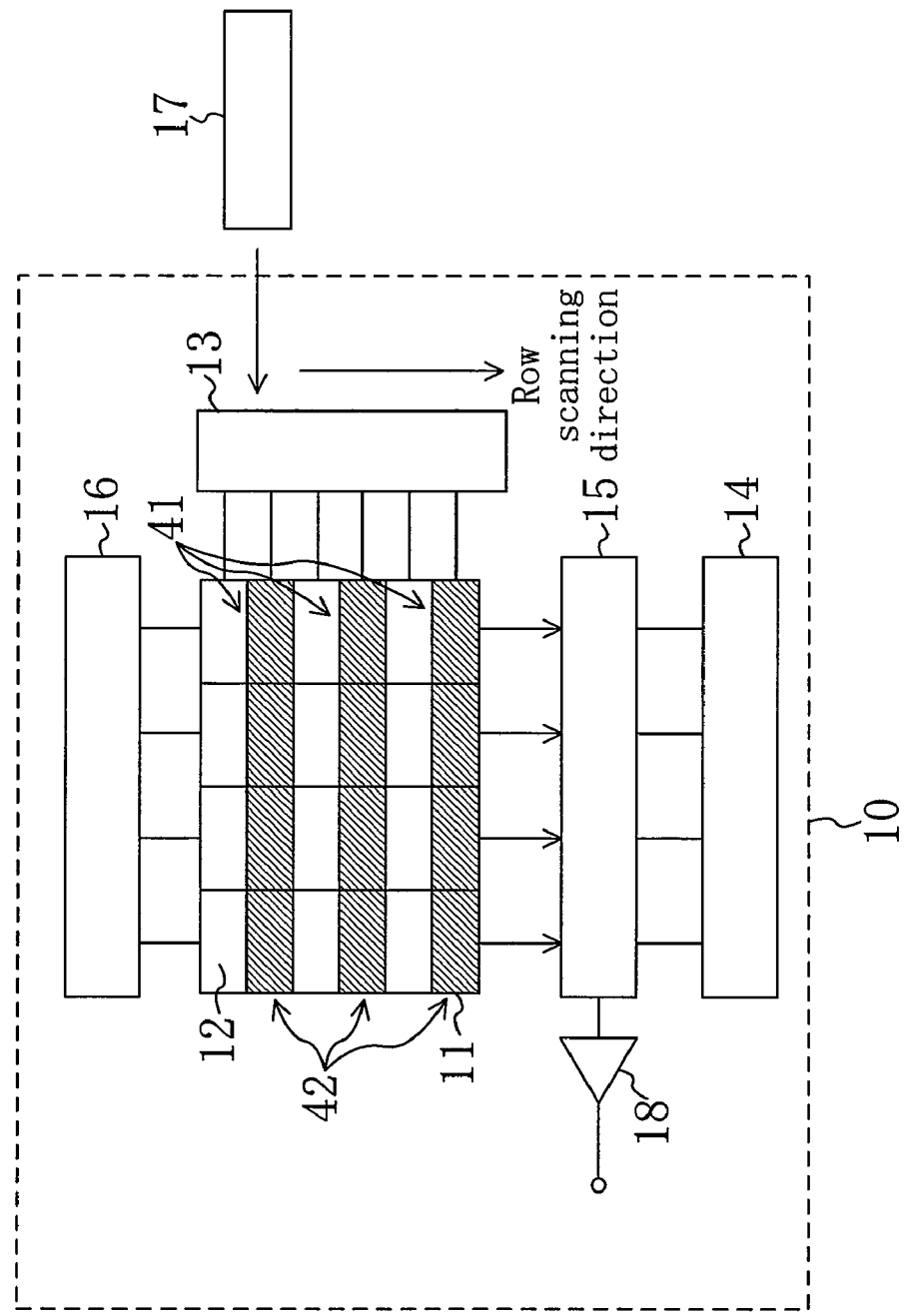
FIG. 1 is a block diagram showing a solid-state imaging device of Embodiment 1 of the present invention.

10 Solid-state imaging device
11 Imaging region
12 Pixel
13 Row scanning circuit
14 Column scanning circuit
15 Signal processing section
16 Load circuit
17 Control section
18 Amplifier
22 Photodiode
23 Read transistor
24 Floating diffusion
25 Reset transistor
26 Amplification transistor
28 Load transistor
32 Read selection transistor
33 Pull-down transistor
34 Selection transistor
36 Reset selection transistor 37 Electronic shutter selection transistor
41 First-group pixel
42 Second-group pixel
43 Initializing portion
44 Output portion
109 Optical system
110 Mechanical shutter
111 Signal processing circuit
112 Monitor screen
207 Vertical output signal line
210 Reset signal line
211 Read signal line
215 Selection signal line
218 Signal read scanning circuit
219 Electronic shutter scanning circuit
501 p-well
502 n-type semiconductor layer
503 Transfer gate
504 Floating diffusion
702 p-well
703 Well contact
704 Photodiode
705 Transfer gate

BEST MODES FOR CARRYING OUT THE INVENTION

Embodiment 1

Circuit Configuration

FIG. 1 shows an outline of a solid-state imaging device of Embodiment 1 of the present invention. As shown in FIG. 1, the solid-state imaging device, denoted by 10, includes an imaging region 11 composed of a plurality of pixels 12 arranged in a matrix. In this embodiment, the pixels 12 include first-group pixels 41 that are read during thinning drive and second-group pixels 42 that are skipped during the thinning drive. Although the first-group pixels 41 and the second-group pixels 42 are arranged every other row in the illustrated example, any other arrangement of these pixels may be adopted.

Each of the pixels 12 is subjected to read operation and reset operation with a read pulse and a reset pulse supplied from a row scanning section 13. The row scanning section 13, connected to a control section 17, generates control pulses such as a transfer pulse and the reset pulse based on various control signals supplied from the control section 17.

Signal charge read from a photoelectric conversion element of each pixel 12 with a control pulse is subjected to processing such as noise removal and amplification in a signal processing section 15, then read to a horizontal signal line with a signal from a column scanning circuit 14, and sent to an amplifier 18 to be output as a pixel signal. A load circuit 16 constitutes a source follower circuit together with an amplification transistor of each pixel 12 described later.

Figure 2:
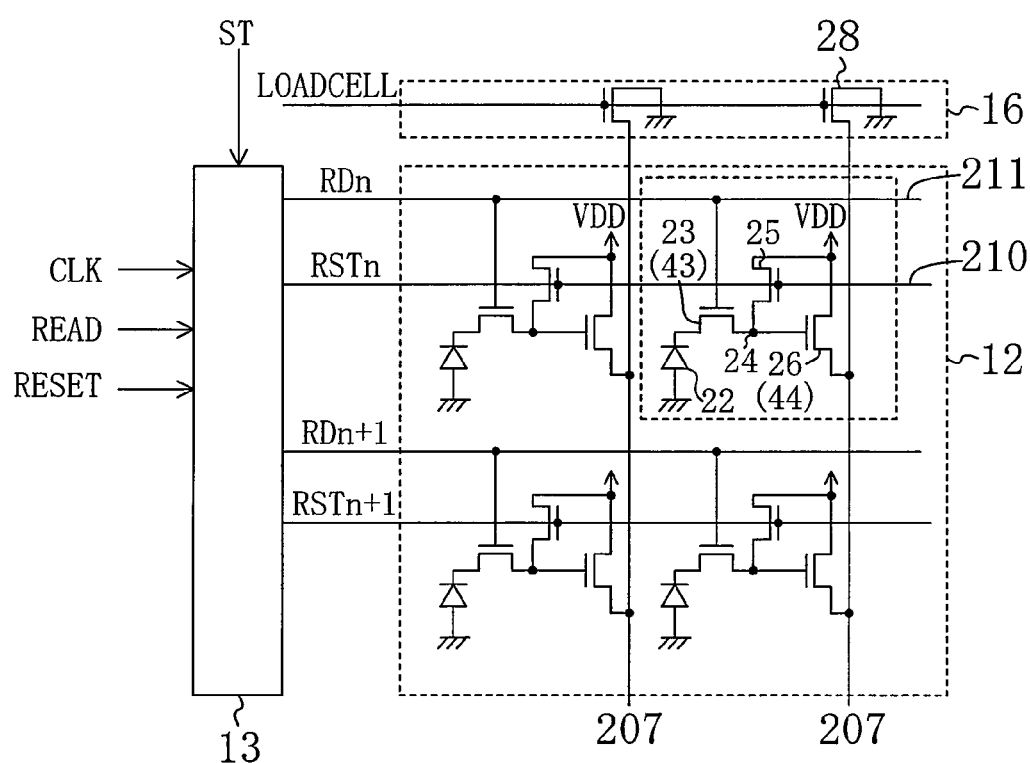
FIG. 2 is a circuit diagram showing a main portion of the solid-state imaging device of Embodiment 1.

FIG. 2 shows in detail a main portion of the solid-state imaging device of this embodiment, which is composed of the pixels 12, the load circuit 16 and the row scanning section 13. Note that in FIG. 2 only pixels in the n-th and (n+1)th rows are shown for simplification of description.

As shown in FIG. 2, each of the pixels 12 includes a photodiode 22 as a photoelectric conversion element, a transfer transistor 23 for transferring signal charge accumulated in the photodiode 22, a floating diffusion (FD) 24 for holding the read signal charge, a reset transistor 25 for resetting the potential of the FD 24 to the initial state, and an amplification transistor 26 for amplifying the signal charge in response to a potential change at the FD 24.

The transfer transistor 23 serves as an initializing portion 43 as it initializes the amount of charge in the photodiode 22 by transferring the charge to the FD 24. The amplification transistor 26 serves as an output portion 44 that outputs the charge in the photoelectric conversion element to a vertical output signal line 207. The amplification transistor 26 is connected to the vertical output signal line 207 provided for each column, and one end of the vertical output signal line 207 is connected to a load transistor 28 provided in the load circuit 16. In this way, the amplification transistor 26 and the load transistor 28 constitute a source follower circuit, to enable a signal from the pixel 12 to be output to the vertical output signal line 207.

The row scanning section 13 starts row scanning operation with a start pulse ST supplied from the control section 17 shown in FIG. 1, and generates a pixel reset pulse RST to be applied to a pixel reset signal line 210 provided for each row and a transfer pulse RD to be applied to a transfer signal line 211 also provided for each row, based on a clock pulse CLK, a reset pulse RESET and a read pulse READ.

It should be noted that although the reset pulse RESET and the read pulse READ are supplied from the control section 17 in the illustrated example, they may otherwise be generated inside the solid-state imaging device 10 based on the start pulse ST and the clock pulse CLK.

<Basic Read Drive>

Figure 3:
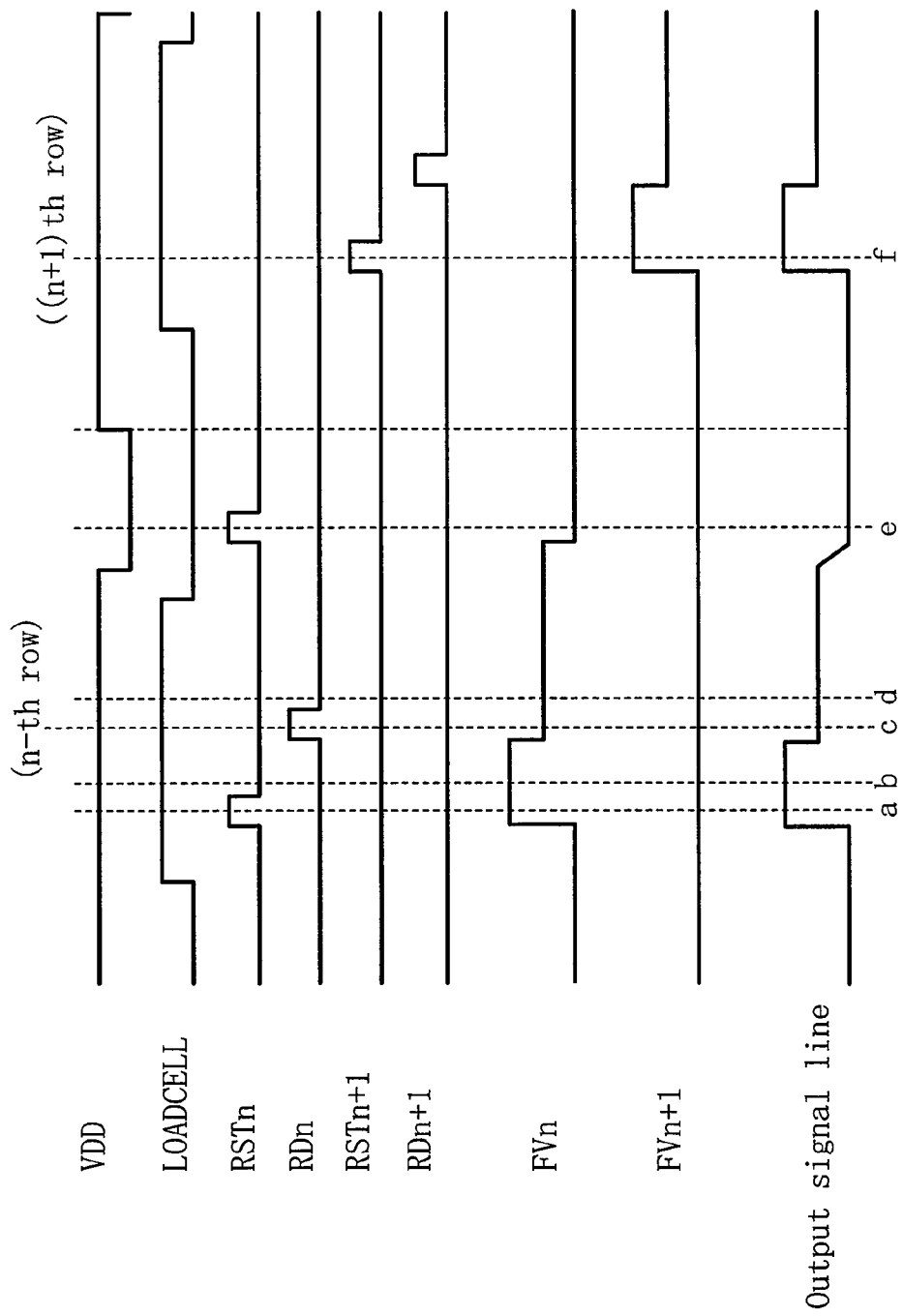
FIG. 3 is a timing chart showing basic drive of the solid-state imaging device of Embodiment 1.

The basic operation of the solid-state imaging device of this embodiment will be described with reference to FIG. 3. FIG. 3 is a timing chart observed when the solid-state imaging device of this embodiment performs basic drive. Note that FIG. 3 shows driving of the pixels 12 in the n-th row, in which $FV_n$, $RST_n$ and $RD_n$ respectively represent the potential of the FDs 24 of the pixels 12 in the n-th row, the pixel reset pulse supplied to the pixel reset signal line 210 for the n-th line and the transfer signal supplied to the transfer signal line 211 for the n-th line. The pixel reset pulse $RST_n$ and the transfer pulse $RD_n$ are generated based on the reset pulse RESET and the read pulse READ, respectively, supplied from the control section 17 and an output $Q_n$ of the n-th stage of a shift register (not shown) provided in the row scanning section 13.

As shown in FIG. 3, the pixel reset pulse $RST_n$ for driving the pixels in the n-th row rises to a high (Hi) potential, to turn ON the reset transistors 25 of the pixels 12 in the n-th row selecting the pixels 12 in the n-th row. Hence, at point a, the potential $FV_n$ is made equal to Hi potential of the power supply $V_{DD}$ for the reset transistors 25 and the amplification transistors 26, and a potential responsive to the resultant potential $FV_n$ is output from the amplification transistors 26 of the pixels 12 in the n-th row, causing rise of the potential of the respective vertical output signal lines 207.

The pixel reset pulse $RST_n$ then falls to a low (Lo) potential, to turn OFF the reset transistors 25. At this time, the potential $FV_n$ is held at Hi potential as indicated at point b.

Thereafter, the transfer pulse $RD_n$ rises to Hi potential, turning ON the transfer transistors 23 of the pixels 12 in the n-th row. This allows charge accumulated in the photodiodes 22 of the pixels 12 in the n-th row according to light information to be read to the FDs 24, causing fall of the potential $FV_n$. With this potential fall, as shown at point c, the potential of the amplification transistors 26 of the pixels 12 in the n-th row falls, causing fall of the potential of the respective vertical output signal lines 207.

The transfer pulse $RD_n$ then falls to Lo potential, to turn OFF the transfer transistors 23 of the pixels 12 in the n-th low. With this, as shown at point d, the potential of the vertical output signal lines 207 is recognized as a potential responsive to the charge accumulated in the photodiodes 22 of the pixels 12 in the n-th row. The signal processing section 15 detects the potentials of each vertical output signal line 207 at points b and d to determine the potential difference therebetween as a pixel signal.

The pixel reset pulse $RST_n$ then rises to Hi potential, to turn ON the reset transistors 25 of the pixels 12 in the n-th row. With this, as shown at point e, the potential $FV_n$ is made equal to Lo potential of the power supply $V_{DD}$, and this turns OFF the amplification transistor 26 of the pixels 12 in the n-th row. Thus, the pixel signal output operation of the pixels 12 in the n-th row is terminated. In other words, the pixels 12 in the n-th row in the imaging region 11 are made non-selected, and at point f, selection and read operation for the pixels 12 in the (n+1)th row is started.

<Thinning Drive>

Figure 4:
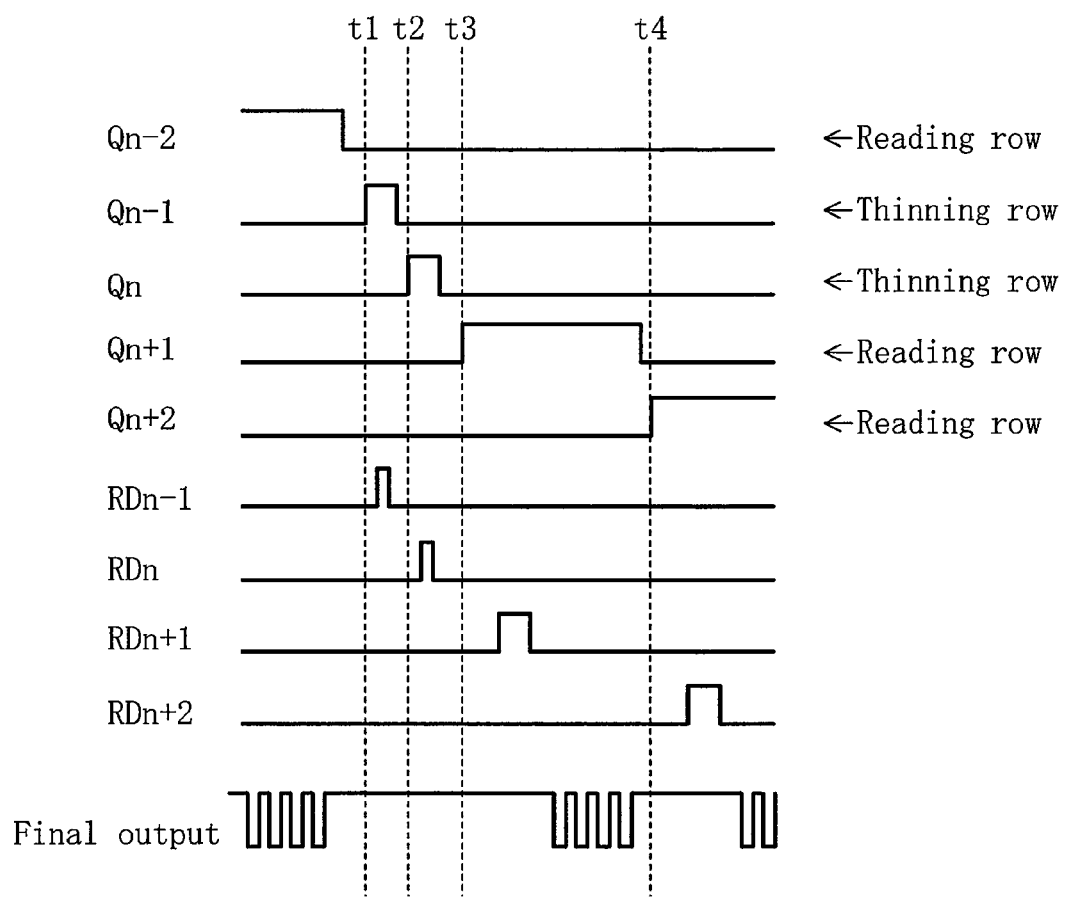
FIG. 4 is a timing chart showing thinning drive of the solid-state imaging device of Embodiment 1.

Thinning drive of the solid-state imaging device of this embodiment will be described with reference to FIG. 4. FIG. 4 is a timing chart showing thinning drive adopted in moving-picture imaging and the like. Note that in FIG. 4, 2-row thinning drive of reading two rows of pixels 12 and thinning two rows of pixels 12 is shown, in which signals from pixels 12 in the (n−1)th and n-th rows are thinned while pixels 12 in the (n+1)th and (n+2)th rows are read. In FIG. 4, $Q_{n-2}$ to $Q_{n+2}$ respectively represent outputs of the (n−2)th to (n+2)th stages of the shift register placed in the row scanning circuit 13. The transfer pulse $RD_n$ supplied to the transfer signal line 211 for the n-th row is generated based on $Q_n$ and the pulse READ, and the pixel reset pulse $RST_n$ supplied to the pixel reset signal line 210 for the n-th row is generated based on $Q_n$ and the pulse RESET. It is indicated in FIG. 4 that the pixels in the n-th row are in the selected state during the time when $Q_n$ is in Hi state. Note that the transfer pulses RD supplied to the transfer signal lines 211 serve as read pulses for reading rows and as discharge pulses for thinning rows.

At time t1, $Q_{n-1}$ goes high (Hi) putting the pixels 12 in the (n−1)th row as a thinning row in the selected state. Subsequently, the transfer transistors 23 of the pixels 12 in the (n−1)th row are turned ON with the transfer pulse $RD_{n-1}$, allowing charge accumulated in the photodiodes 22 of the pixels 12 in the (n−1)th row to be released to the FDs 24.

After $Q_{n-1}$ falls, $Q_n$ goes Hi at time t2. The transfer transistors 23 of the pixels 12 in the n-th row are then turned ON with the transfer pulse $RD_n$, allowing charge accumulated in the photodiodes 22 of the pixels 12 in the n-th row to be read.

With the release of the accumulated charge to the FDs 24 in the (n−1)th and n-th rows, the potential changes are transmitted to the vertical output signal lines 207 via the amplification transistors 26. However, since the signal processing section 15 can be configured not to handle such potential changes as pixel signals, signals released from pixels in thinning rows do not appear in the final output. More specifically, a sample hold circuit provided in the signal processing section 15 is configured not to hold a potential change in a signal released from a pixel 12 in a thinning row.

After $Q_n$ falls, $Q_{n+1}$ goes Hi at t3. The transfer transistors 23 of the pixels 12 in the (n+1)th row are then turned ON with the transfer pulse $RD_{n+1}$, allowing charge accumulated in the photodiodes 22 of the pixels 12 in the (n+1)th row to be read.

After $Q_{n+1}$ falls, $Q_{n+2}$ goes Hi at t4. The transfer transistors 23 of the pixels in the (n+2)th row are then turned ON with the transfer pulse $RD_{n+2}$, allowing charge accumulated in the photodiodes 22 of the pixels 12 in the (n+2)th row to be read.

Signals from the pixels 12 in the (n+1)th and (n+2)th rows as reading rows are subjected to sample holding and the like, and then output as the final output as shown in FIG. 4.

In the thinning drive by the solid-state imaging device of this embodiment, the pulse width of the transfer pulses $RD_{n-1}$ and $RD_n$ applied to the pixels 12 in the (n−1)th and n-th rows as thinning rows is smaller than the pulse width of the transfer pulses $RD_{n+1}$ and $RD_{n+2}$ applied to the pixels 12 in the (n+1)th and (n+2)th rows as reading rows. Therefore, while the accumulated charge is completely read out from the photodiodes 22 of the pixels 12 in the reading rows, the accumulated charge is incompletely released from the photodiodes 22 of the pixels 12 in the thinning rows.

With the above operation, it is possible to prevent the occurrence that charge accumulated in the photodiode 22 of a pixel 12 of which read is skipped during the thinning drive reaches a saturation amount and overflows into an adjacent photodiode 22 causing generation of a false signal. Moreover, the potential of the p-well in the imaging region 11 can be prevented from varying and stabilized. As a result, not only high-quality images hardly having smearing, blooming or color mixing can be obtained, but also the time required for read and reset operation and the like can be shortened permitting high-speed thinning drive.

The drive timing shown in FIG. 4 can be implemented by controlling the pulses 25 supplied from the control section 17 to the row scanning section 13 shown in FIG. 1 to change the pulse width of the read pulse READ.

Hereinafter, the principle on which the effect described above is obtained by incompletely releasing accumulated charge from the photodiodes 22 of pixels in a thinning row will be described.

Figure 5:
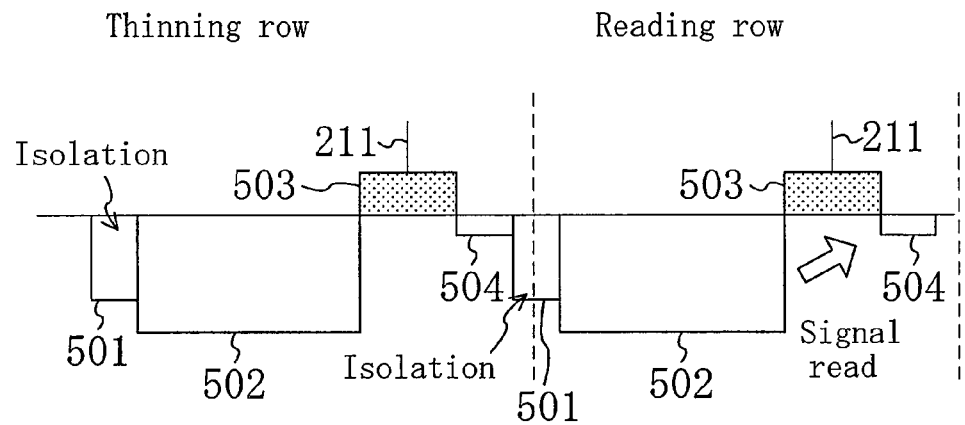
FIG. 5 is a cross-sectional view showing a pixel portion of the solid-state imaging device of Embodiment 1.

FIG. 5 shows in section a pixel portion of the solid-state imaging device of this embodiment. As shown in FIG. 5, a plurality of n-type semiconductor layers 502 are formed in a p-well 501. A transfer gate 503 is placed between each n-type semiconductor layer 502 and an FD 504 as an $n^+$-type semiconductor layer. The n-type semiconductor layer 502 is provided for each pixel, and the p-well 501 is continuous over the entire imaging region. The n-type semiconductor layer 502 and the p-well 501 constitute a photodiode, allowing signal charge generated with incidence of light to be accumulated in the n-type semiconductor layer 502. The accumulated signal charge is read out to the FD 504 by applying a read pulse READ to the transfer gate 503.

Figure 6:
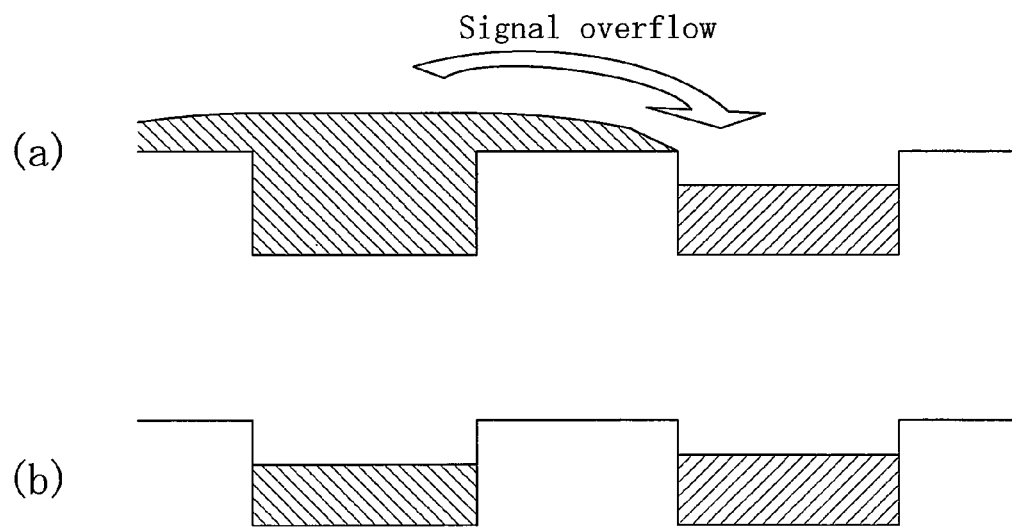
FIGS. 6A and 6B are diagrammatic views of the potentials of photodiodes in a conventional solid-state imaging device that does not perform signal charge release operation shown for comparison (FIG. 6A), and in the solid-state imaging device of Embodiment 1 (FIG. 6B).

FIGS. 6A and 6B show potentials of the semiconductors shown in section in FIG. 5, in which FIG. 6A shows the case of a conventional solid-state imaging device that performs thinning drive by merely not selecting pixels, and FIG. 6B shows the case of the solid-state imaging device of this embodiment. In the case of the conventional solid-state imaging device, as shown in FIG. 6A, in which charge is not released during the thinning drive, charge generated with increase in light incident amount will exceed the saturation signal amount of the photodiode of a pixel in a thinning row involving no read, overflowing into a photodiode of an adjacent pixel causing color mixing and the like.

In the case of the thinning drive of the solid-state imaging device of this embodiment, as shown in FIG. 6B, a fixed amount of accumulated charge is read from the photodiode to the FD even for a pixel in a thinning row involving no read. Therefore, the photodiode in a thinning row is prevented from being saturated, and thus high-quality images hardly causing smearing, blooming, color mixing or the like can be obtained.

Figure 7:
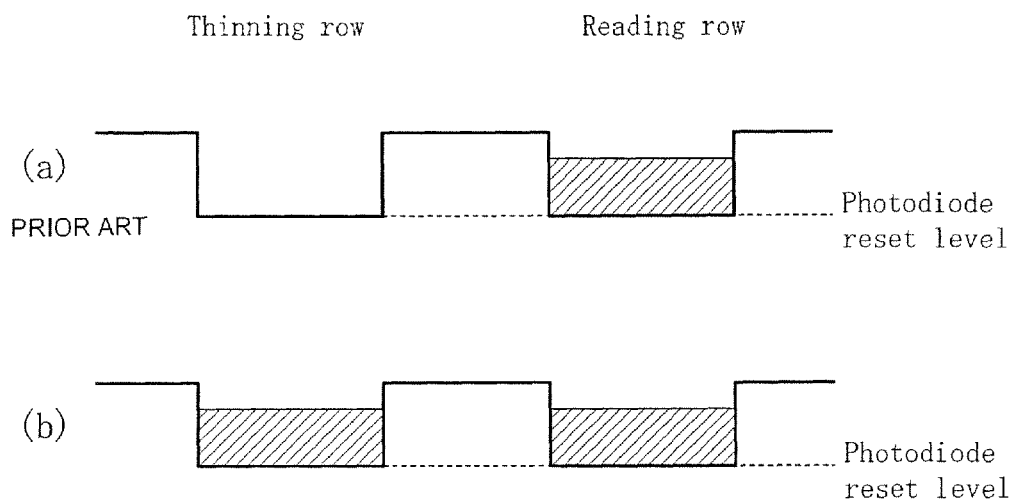
FIGS. 7A and 7B are diagrammatic views of the potential of photodiodes in a conventional solid-state imaging device that performs complete signal charge release operation shown for comparison (FIG. 7A), and in the solid-state imaging device of Embodiment 1 (FIG. 7B).

The potential state of the p-well during the thinning drive will be described with reference to FIGS. 7A, 7B and 8. FIGS. 7A and 7B show potentials of photodiodes of solid-state imaging devices, in which FIG. 7A shows the case of a conventional solid-state imaging device that releases charge in pixels in thinning rows completely, and FIG. 7B shows the case of the solid-state imaging device of this embodiment that performs thinning drive.

In the conventional case, as shown in FIG. 7A, charge has been released from the photodiode in a thinning row involving no read to obtain the reset level. In this embodiment, as shown in FIG. 7B, although a fixed amount of charge has been released from the photodiode in a thinning row to avoid overflowing of charge into an adjacent pixel, but all of the charge in the photodiode is not released but some of the charge is kept accumulated in the photodiode. Having such a potential, the variation in the potential of the p-well can be suppressed.

Figure 8:
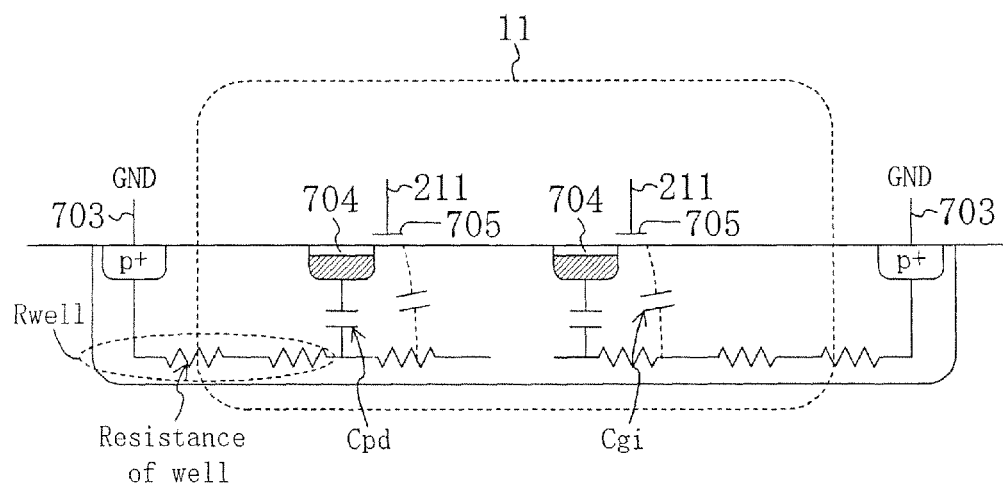
FIG. 8 is a cross-sectional view showing resistances and capacitances generated in an imaging region of the solid-state imaging device of Embodiment 1.

FIG. 8 shows a distribution of capacitances and resistances generated in the imaging region of the solid-state imaging device. Well contacts 703 for fixing a p-well 702 to the ground potential are placed in a region surrounding the imaging region 11 to maximize the area of photodiodes 704.

As shown in FIG. 8, the p-well 702 is at the ground potential during normal operation. In a transient state, however, the potential fixation to the ground potential is insufficient in the center portion of the imaging region 11 because the resistances of the p-well 702 are high. Therefore, when a read pulse is applied to a transfer gate 705, the potential of the p-well 702 varies via a coupling capacitance Cg1 generated between the transfer gate 705 and the substrate. This potential variation has a time constant determined by the product of a resistance $R_{well}$, determined by the distance between the position of the transfer gate 705 in the p-well 702 and the well contact 703, and the total sum of coupling capacitance at the position of the transfer gate 705.

Therefore, if the charge in a photodiode 704 of a pixel in a thinning row has been completely released during the thinning drive, the total sum of coupling capacitance is relatively small, and thus the time constant taken to cause potential variation is small, compared with the case that the photodiode 704 holds a fixed amount of charge. Hence, the potential of the p-well 702 rises in a short time with application of a read pulse.

If the photodiode 704 of a pixel in a thinning row holds a fixed amount of charge, the total sum of coupling capacitance is relatively large, and thus the rise of the potential with a read pulse is slow. Accordingly, the variation in the potential of the p-well 702 within the time of read operation and reset operation is small compared with the case that the charge of the photodiode 704 has been completely released. As a result, the time required for read and reset operation can be shortened, to enable high-speed thinning drive. Thus, a higher frame rate can be secured during moving-picture imaging.

The width of the discharge pulse for thinning rows in this embodiment is preferably set to be the smallest with that can be determined with the reference clock (CLK). With this setting, thinning rows can be easily driven with the discharge pulse although the row selection time period for the thinning rows is set short compared with that of reading rows.

First Alteration to Embodiment 1

Figure 9:
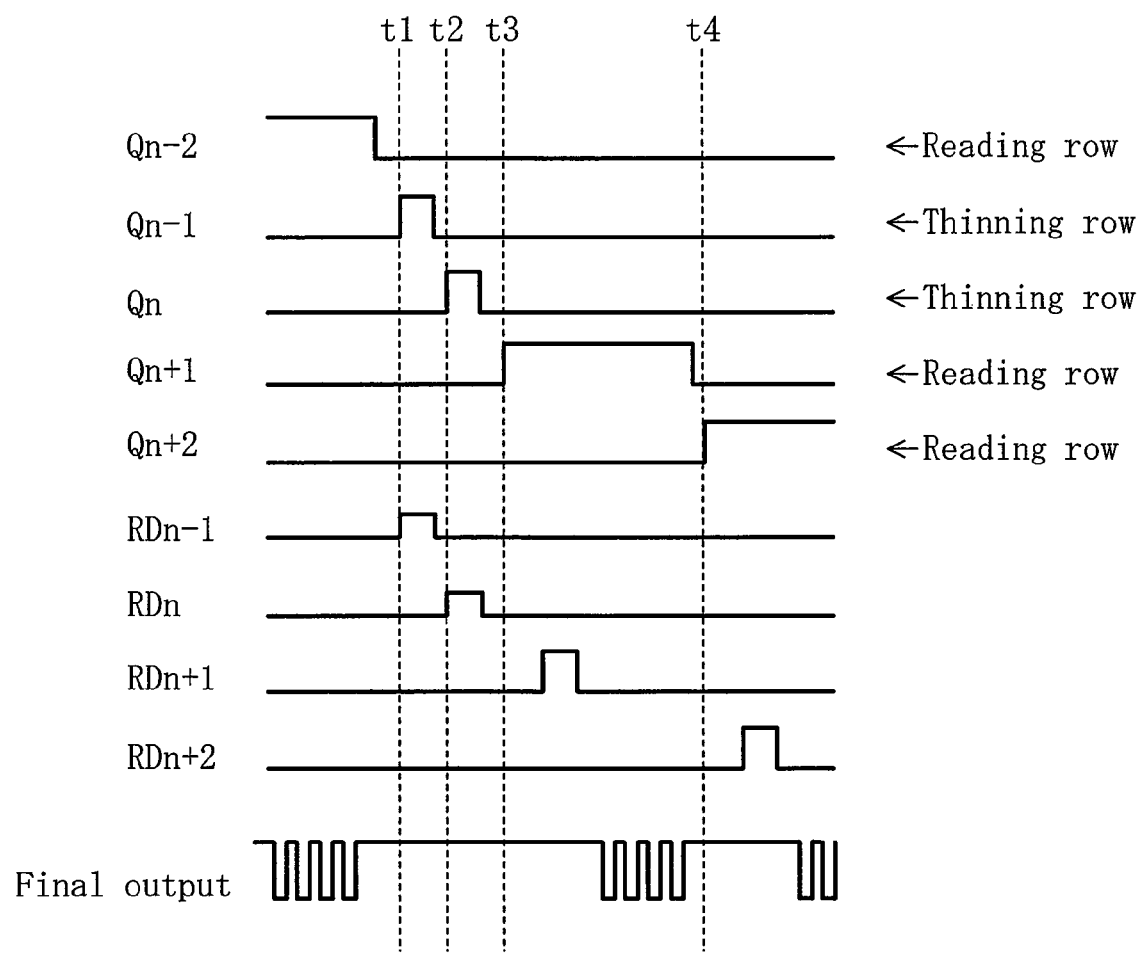
FIG. 9 is a timing chart showing thinning drive of a first alteration to the solid-state imaging device of Embodiment 1 of the present invention.

The first alteration to Embodiment 1 will be described with reference to FIG. 9. FIG. 9 shows timing in thinning drive in a solid-state imaging device of this alteration.

As shown in FIG. 9, the solid-state imaging device of this alteration sets the voltage level (pulse height) in the Hi state of the transfer pulses $RD_{n-1}$ and $RD_n$ applied to the transfer signal lines 211 for thinning rows to be smaller than the pulse height of the transfer pulses $RD_{n+1}$ and $RD_{n+2}$ applied to the transfer signal lines 211 for reading rows. By reducing the pulse height of the transfer pulses $RD_{n-1}$ and $RD_n$, the drive voltage for the transfer transistors 23 becomes low, and this decreases the signal charge amount released from the photodiodes 22. In this way, it is possible to release charge incompletely from thinning rows involving no read.

In the solid-state imaging device of this alteration, the timing at which the signals are generated from the control section 17 may be the same as that in the conventional case. To change the pulse height at and from a specified row, it is necessary to provide a buffer circuit composed of an inverter circuit and the like individually for each output portion of the row scanning section 13 and change the power supply for the buffer circuit. Alternatively, the pulse height of the read pulse READ supplied from the control section 17 may be changed, and a signal having the changed pulse height may be selectively supplied for signal read from the photodiodes 22.

Second Alteration to Embodiment 1

Figure 10:
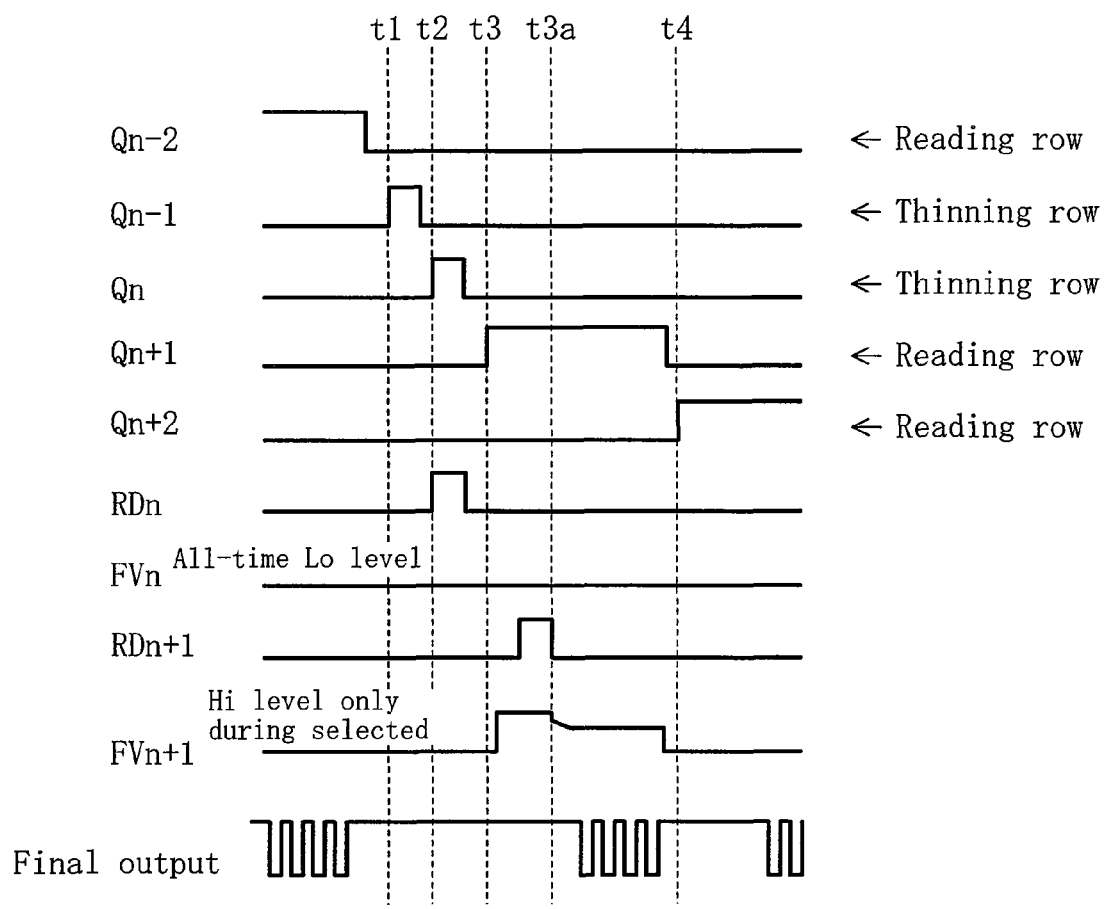
FIG. 10 is a timing chart showing thinning drive of a second alteration to the solid-state imaging device of Embodiment 1 of the present invention.

The second alteration to Embodiment 1 will be described with reference to FIG. 10. FIG. 10 shows operation timing in thinning drive in a solid-state imaging device of this alteration.

As shown in FIG. 10, in the solid-state imaging device of this alteration, the potential of the FD 24 of each pixel in a thinning row is not reset to Hi potential at the time of selection of the thinning row in the thinning drive, but is fixed to Lo potential at all times. More specifically, when the FDs 24 in a thinning row are initialized at the start of the thinning drive, the power supply $V_{DD}$ is set at Lo potential and the pixel reset pulses $RST_{n-1}$ and $RST_n$ are turned to Hi potential. Thereafter, at the selection of the thinning rows, the pixel reset pulses $RST_{n-1}$ and $RST_n$ are not raised. With this, the potentials $FV_{n-1}$ and $FV_n$ of the FDs 24 in the (n−1)th and n-th rows are fixed to Lo potential at all times.

In the thinning drive, even if a signal is released from the photodiode 22 to the FD 24 of a pixel in a thinning row, the potential of the FD 24 in the thinning row will not rise because this is read of charge. Note that in the initial setting, if the Lo potential of the power supply $V_{DD}$ is equal to the ground potential, charge will flow in reverse from the power supply $V_{DD}$ to the photodiode 22. In consideration of this, the Lo potential of the power supply $V_{DD}$ must be a potential that is higher than the ground to such an extent as to cause no reverse flow to the photodiode 22.

When the (n−1)th and n-th rows as thinning rows are selected and receive the transfer pulses $RD_{n-1}$ and $RD_n$, charge accumulated in the photodiodes 22 in the (n−1)th and n-th rows is released. However, since the potential difference between the FD 24 and the photodiode 22 is not large in each pixel, the charge is released only incompletely. In this way, substantially the same effect as that obtained by the solid-state imaging device of Embodiment 1 is obtained. In the solid-state imaging device of this alteration, normal charge read is performed in the (n+1)th and (n+2)th rows as reading rows. For example, the potential $FV_{n+1}$ of the FDs 24 in the (n+1)th row decreases with charge read (at time t3a) by the amount of the signal charge from the initial state observed immediately after the resetting, so that the potential difference between the resultant potential and the initial state is finally output.

For high-speed read, the row selection time period for thinning rows is set to be as short as possible. It may therefore be difficult to apply the reset pulse and the discharge pulse to the thinning rows within this time period. However, in the solid-state imaging device and its drive method of this alternation, in which the reset pulse is not raised for the thinning rows, the supply of pulses for the thinning rows is less likely to cause a problem.

Embodiment 2

Figure 11:
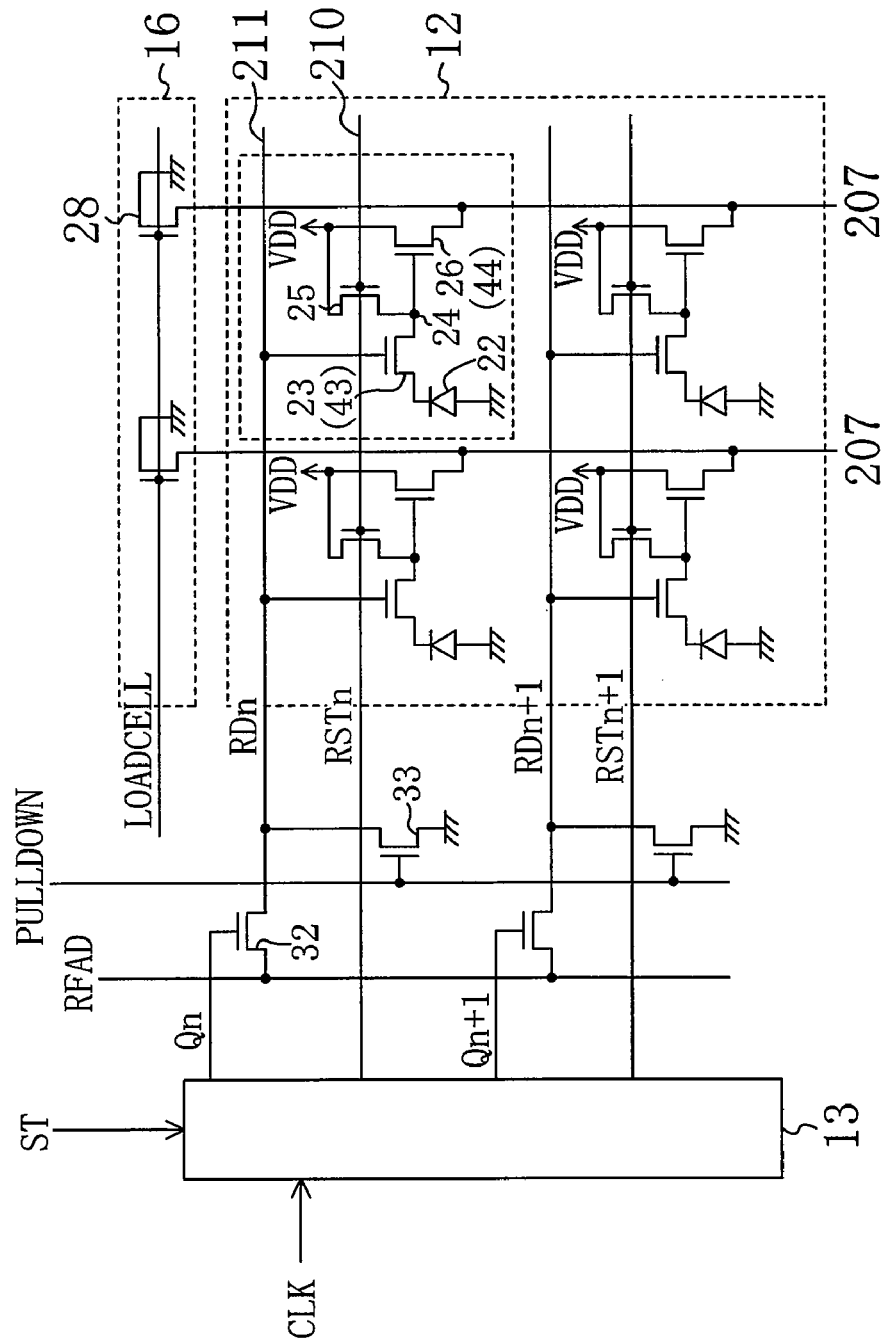
FIG. 11 is a circuit diagram showing a main portion of a solid-state imaging device of Embodiment 2 of the present invention.

Embodiment 2 of the present invention will be described with reference to the relevant drawings. FIG. 11 shows a circuit configuration of a main portion of a solid-state imaging device of Embodiment 2. In FIG. 11, the same components as those in FIG. 2 are denoted by the same reference numerals, and the description thereof is omitted here. The entire block configuration of the solid-state imaging device is the same as that of Embodiment 1.

As shown in FIG. 11, the solid-state imaging device of this embodiment has a read selection transistor 32 and a pull-down transistor 33 for each row. The read selection transistor 32 for the n-th row receives at its gate an output signal $Q_n$ from the shift register provided in the row scanning section 13 and receives at its drain a read pulse READ supplied from the control section 17, to thereby supply a transfer pulse $RD_n$ for the n-th row to the transfer signal line 211 for the n-th row. The pull-down transistor 33 for the n-th row grounds the transfer signal line 211 for the n-th row with a pulse PULLDOWN input into its gate, to give the ground potential.

Figure 12:
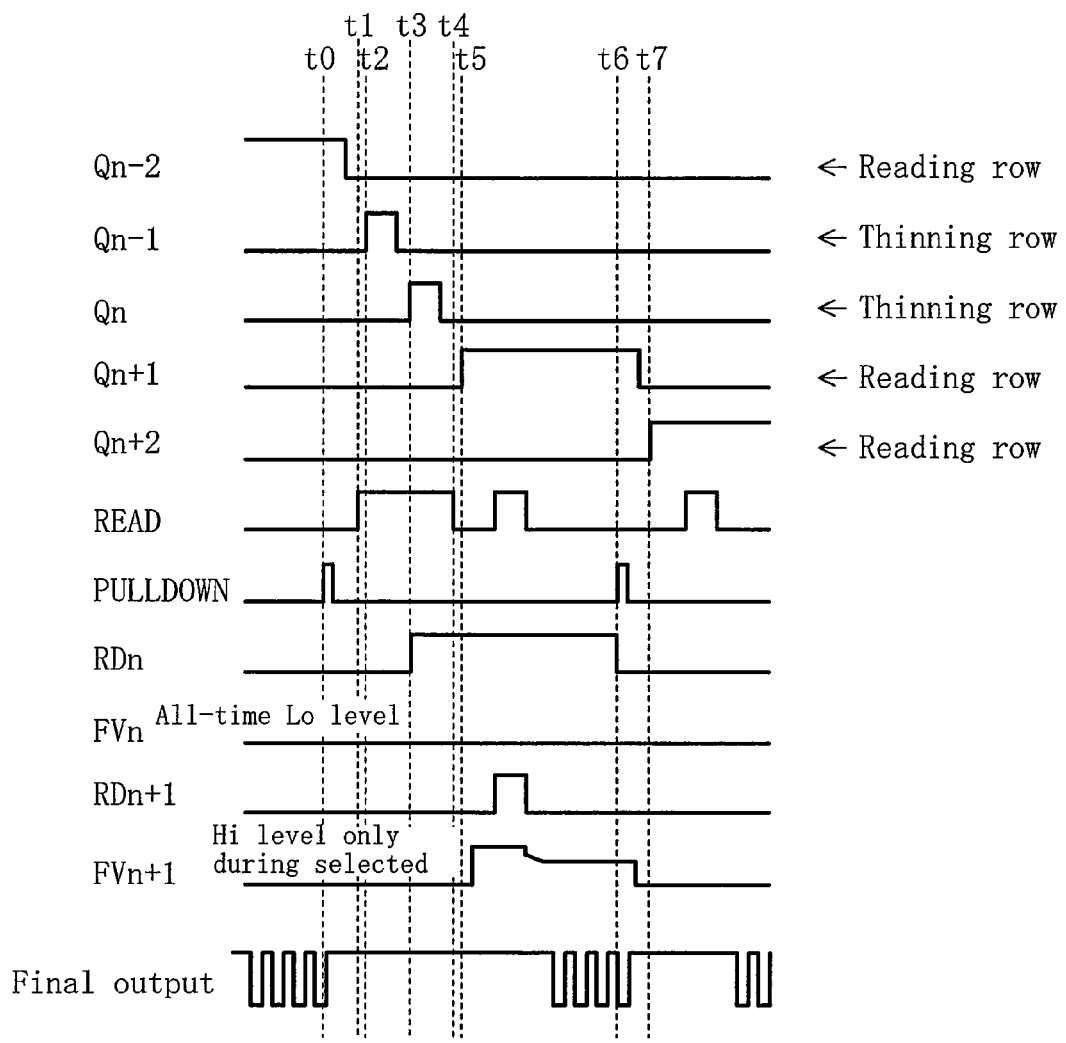
FIG. 12 is a timing chart showing thinning drive of the solid-state imaging device of Embodiment 2.

FIG. 12 shows timing in thinning drive in the solid-state imaging device of this embodiment. As shown in FIG. 12, at time t0, at which $Q_{n-2}$ is in Hi state selecting the (n−2)th row, the pulse PULLDOWN is applied to the pull-down transistors 33, turning the transfer signal lines 211 for all rows to the ground potential to put all rows in the non-selected state.

After the read pulse READ is turned to Hi state at time t1, $Q_{n-1}$ goes Hi at time t2. This turns ON the read selection transistor 32 for the (n−1)th row, and allows the transfer pulse $RD_{n-1}$ for the (n−1)th row to be supplied to the transfer signal line 211 for the (n−1)th row, to put the (n−1)th row as a thinning row in the selected state. At this time, although not shown in FIG. 12, the pixel reset pulse $RST_{n-1}$ is set at Lo potential to thereby fix the potential $FV_{n-1}$ of the FDs 24 in the (n−1)th row at Lo potential. This operation is substantially the same as that of the solid-state imaging device of the second alteration to Embodiment 1.

With the transfer pulse $RD_{n-1}$, the transfer transistors 23 in the (n−1)th row are turned ON, allowing charge accumulated in the photodiodes 22 in the (n−1)th row to be released to the FDs 24 in the (n−1)th row. This release of the accumulated charge is incomplete as in the case of the solid-state imaging device of the second alteration to Embodiment 1.

After $Q_{n-1}$, falls, $Q_n$ goes Hi at time t3. At this time, since the pulse READ is continuously in Hi potential, the transfer pulse $RD_n$ for the n-th row is output to put the n-th row as a thinning row in the selected state. Since the potential $FV_n$ of the FDs 24 in the n-th row is Lo, the release of the accumulated charge is incomplete. Also, even though $Q_{n-1}$ falls turning OFF the read selection transistors 32 in the (n−1)th row, the transfer signal line 211 for the (n−1)th row holds the Hi potential since the pull-down transistor 33 is in the OFF state. That is to say, charge in the photodiodes 22 in the (n−1)th row is continuously released to the FDs 24 in the (n−1)th row during the time when charge in the photodiodes 22 in the n-th row is being released incompletely to the FDs 24 in the n-th row.

After $Q_n$ falls, the pulse READ goes Lo at time t4. By having such timing, both the transfer signal lines 211 for the (n−1)th and n-th rows can keep the Hi potential even after READ goes Lo.

After $Q_{n+1}$ goes Hi at time t5, the pulse READ rises to Hi potential, allowing the transfer pulse $RD_{n+1}$ to be supplied to the (n+1)th row as a reading row, and this permits charge accumulated in the photodiodes 22 in the (n+1)th row to be read to the FDs 24 in the (n+1)th row. At this time, although not shown in FIG. 12, the pixel reset pulse $RST_{n+1}$ has been output to the reset transistors 25 in the (n+1)th row before the output of the transfer pulse $RD_{n+1}$, resetting the FDs 24 in the (n+1)th row to the initiate state. The accumulated charge is therefore read completely. The pulse READ then falls turning the transfer signal line 211 for the (n+1)th row to Lo potential to thus complete the read operation.

At time t6, the pulse PULLDOWN is applied. After falling of this pulse, $Q_{n+1}$ falls to put the (n+1)th row into the non-selected state. With the pulse PULLDOWN, the transfer signal lines 211 for all rows are reset to the ground potential at time t6, and with this, the signal read operation for the (n−1)th row and the n-th row is terminated.

In FIG. 12, only the transfer pulse $RD_n$ for the n-th row is shown. Although not shown, the transfer pulse $RD_{n-1}$ for the (n−1)th row is in Hi potential from time t2 until time t6.

As shown in FIG. 12, for achievement of high-speed read, the row selection time period for a thinning row is set as short as possible. Therefore, it is difficult in some cases to apply the reset pulse and the discharge pulse to the thinning row within this time period. For this reason, circuit change and the like for shortening pulses supplied to thinning rows may be necessary. With the device configuration and operation timing shown in this embodiment, however, such circuit change and the like for shortening the discharge pulse are no more necessary. Also, in the case of releasing the accumulated charge when the FDs 24 are in Lo potential, it is difficult to read a desired amount of charge if the discharge pulse width is extremely small. This problem can be solved by delaying the fall of the discharge pulse for a thinning row by one horizontal time period to thereby secure a long signal release operation time for the thinning row, as described in this embodiment.

Figure 13:
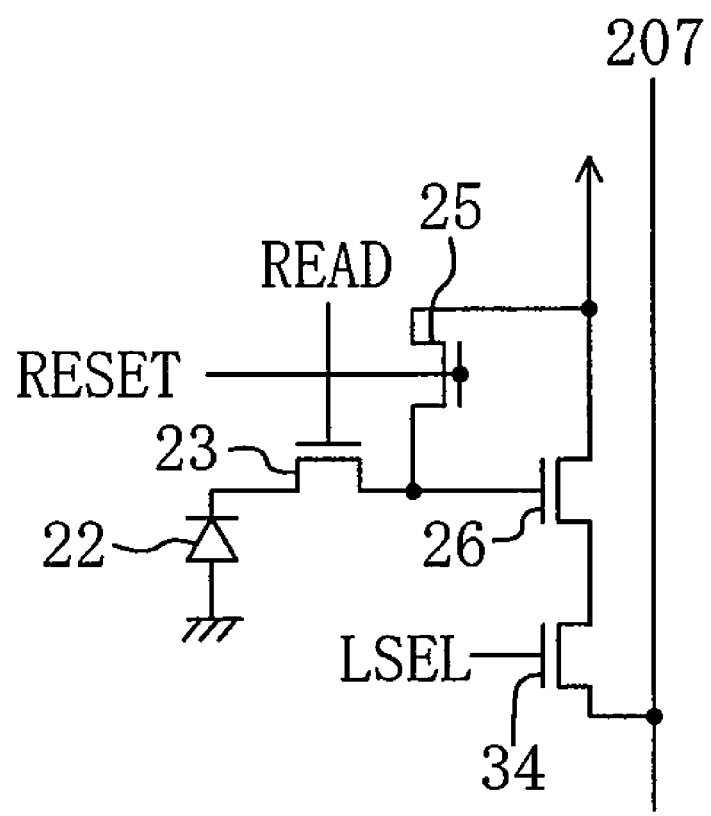
FIG. 13 is a circuit diagram of another example of the solid-state imaging device of Embodiment 1 or 2 of the present invention.

In Embodiments 1 and 2, a selection transistor 34 may be provided as shown in FIG. 13. In this case, the power supply $V_{DD}$ may be fixed, not being pulse-driven, and row selection may be made with ON/OFF of the selection transistor 34.

Embodiment 3

Figure 14:
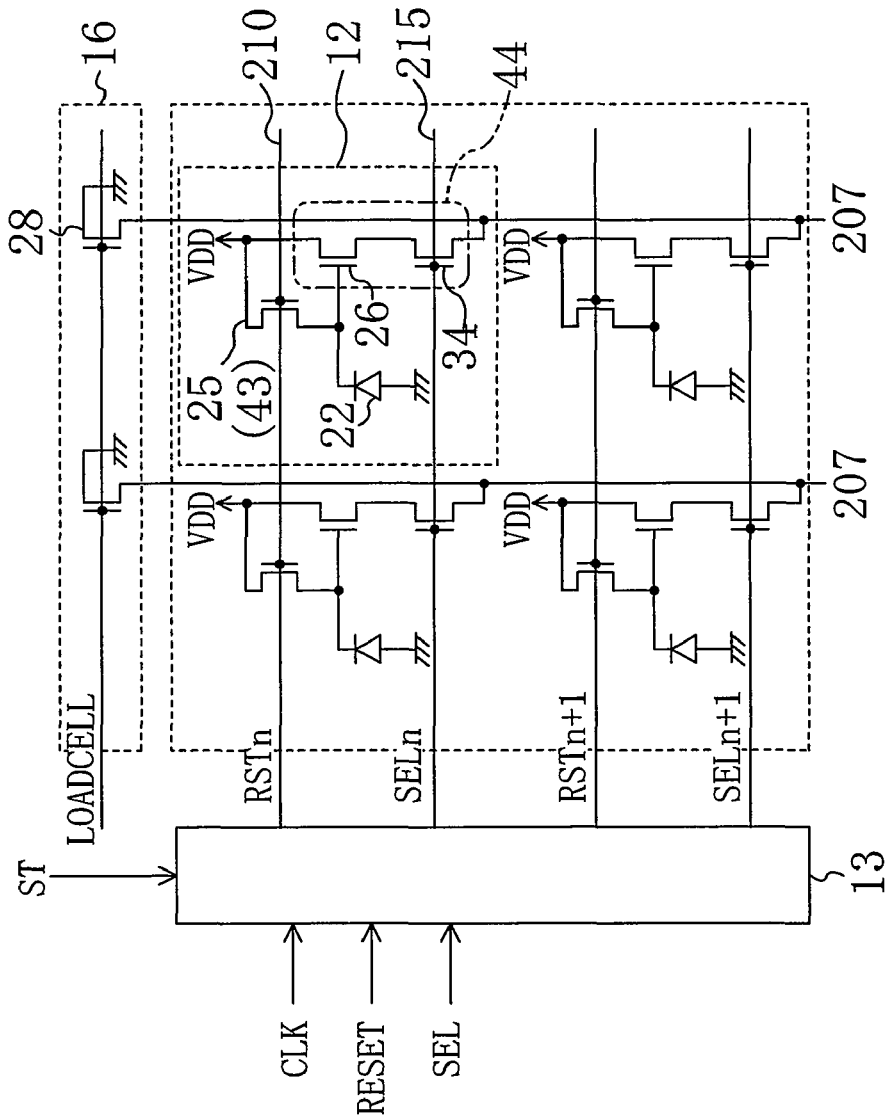
FIG. 14 is a circuit diagram showing a main portion of a solid-state imaging device of Embodiment 3 of the present invention.

Embodiment 3 of the present invention will be described with reference to the relevant drawings. FIG. 14 shows a circuit configuration of a main portion of a solid-state imaging device of Embodiment 3. In FIG. 14, the same components as those in FIG. 2 are denoted by the same reference numerals, and the description thereof is omitted here. The entire block configuration of the solid-state imaging device is the same as that of Embodiment 1.

As shown in FIG. 14, the solid-state imaging device of this embodiment does not include the transfer transistors 23 and the transfer signal lines 211, but instead includes selection transistors 34 and selection signal lines 215.

The photodiode 22 in each pixel is connected to the source of the reset transistor 25 and the gate of the amplification transistor 26, and the signal output from the amplification transistor 26 is read to the vertical output signal line 207 by switching ON/OFF the selection transistor 34. Therefore, the reset transistor 25 serves as the initializing portion 43 for initializing the potential of the photodiode 22, and the amplification transistor 26 and the selection transistor 34 serve as the output portion 44.

<Basic Drive>

Figure 15:
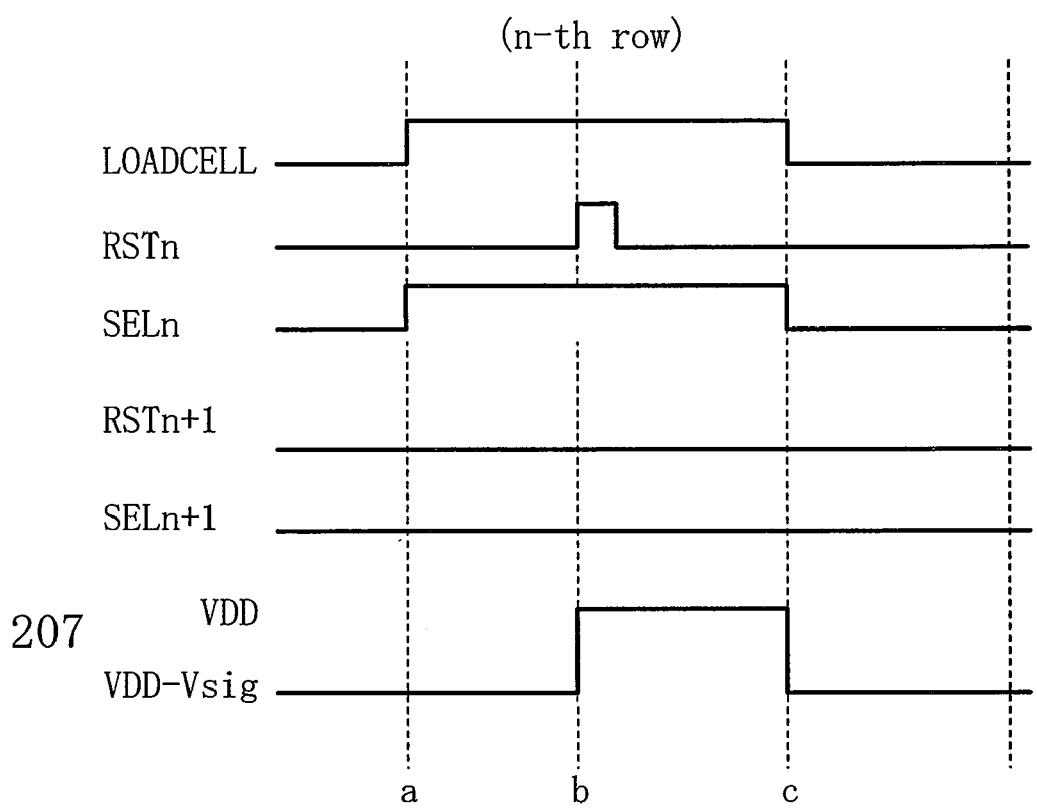
FIG. 15 is a timing chart showing basic drive of the solid-state imaging device of Embodiment 3.

The basic operation of the solid-state imaging device of this embodiment will be described with reference to FIG. 15. FIG. 15 is a timing chart observed when the solid-state imaging device of this embodiment is driven. Note that FIG. 15 shows the case of driving pixels in the n-th row.

First, a pulse LOADCELL goes Hi, turning ON the load transistors 28, and also a selection signal $SEL_n$ for the n-th row goes Hi turning ON the selection transistors 34, to thereby select pixels in the n-th row (point a). With this selection, a signal responsive to the gate potential ($V_{DD}$-$V_{sig}$) of the amplification transistor 26, which has changed with the charge accumulated in the photodiode 22 of each pixel in the n-th row from the fall of the preceding pixel reset pulse $RST_n$ up to this time point, is read to the corresponding vertical output signal line 207.

The pixel reset pulse $RST_n$ supplied to the pixel reset signal line 210 for the n-th row then rises to Hi potential turning ON the reset transistors 25. This permits the charge to be released compulsively from the photodiodes 22 in the n-th row, and the reset potential to appear on the vertical output signal lines 207 (point b).

The signal processing section 15 performs subtraction between the above two signal potentials with a clamp circuit and the like, and outputs the resultant difference as a signal voltage.

The pulse LOADCELL then falls to Lo potential turning OFF the load transistors 28, and the selection signal $SEL_n$ for the n-th low falls to Lo potential turning OFF the selection transistors 34. In this way, the selection operation for the n-th row is terminated (point c).

<Thinning Drive>

Figure 16:
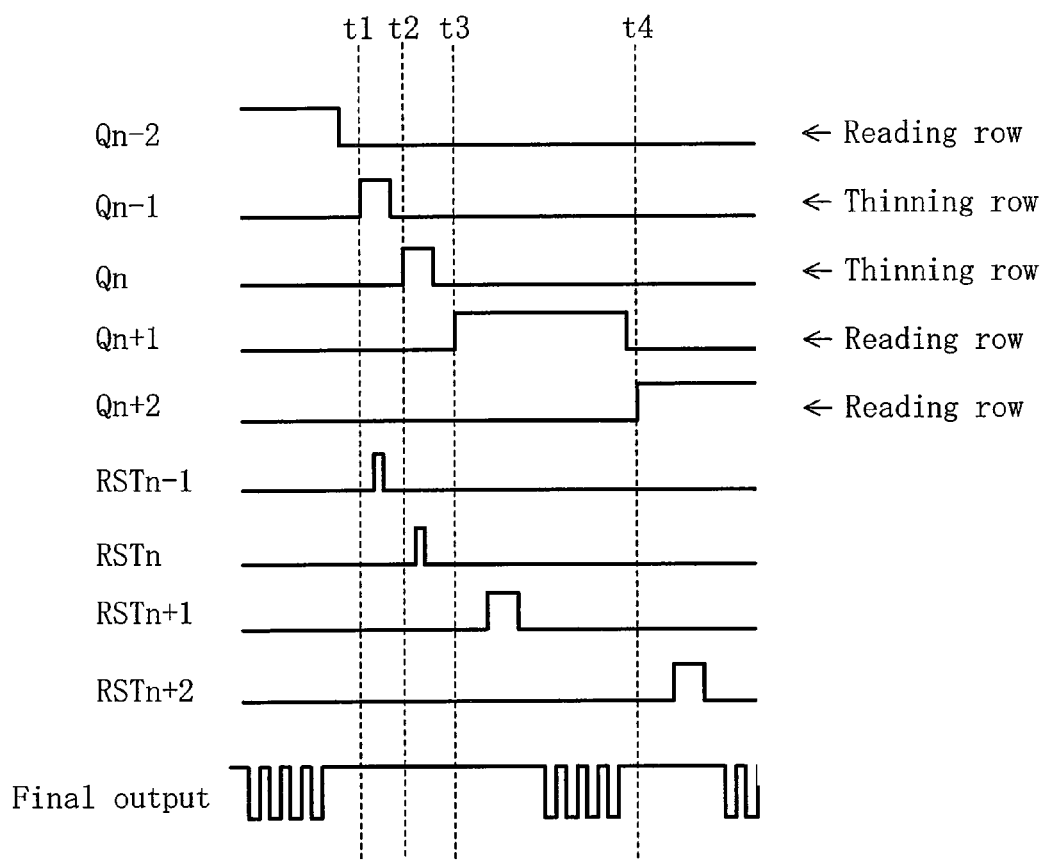
FIG. 16 is a timing chart showing thinning drive of the solid-state imaging device of Embodiment 3.

Thinning drive of the solid-state imaging device of this embodiment will be described with reference to FIG. 16. FIG. 16 shows the timing in 2-row thinning drive adopted in moving-picture imaging and the like, in which two rows are read and then two rows are thinned.

In FIG. 16, $Q_{n-2}$ to $Q_{n+2}$ represent outputs from the shift register placed in the row scanning circuit 13. The pixel reset pulse $RST_n$ to be applied to the pixel reset signal line 210 for the n-th row is generated based on $Q_n$ and the reset pulse RESET received from the control section. It is indicated in FIG. 16 that the pixels 12 in the n-th row are in the selected state during the time when $Q_n$ is in the Hi state.

First, at time t1, $Q_{n-1}$ goes Hi putting the pixels in the (n-1)th row as a thinning row in the selected state. With this selection, release of charge accumulated in the photodiodes 22 in the (n-1)th row is started. More specifically, the reset transistors 25 in the (n-1)th row are turned ON with the pixel reset pulse $RST_{n-1}$, permitting the photodiodes 22 to be reset to the potential of the power supply $V_{DD}$.

After $Q_{n-1}$ falls, $Q_n$ goes Hi at time t2, to allow accumulated charge to be released from the photodiodes 22 in the n-th row. With the row selection operation for the (n-1)th and n-th rows, the signal from the photodiodes 22 is transmitted to the vertical output signal lines 207 via the respective amplification transistors 26 as signals. However, since the signal processing section 15 can be configured not to handle such signals as pixel signals, signals from thinning rows won't be output finally. More specifically, a sample hold circuit provided in the signal processing section 15 is configured not to hold the above potential change to thereby prevent output of such signals.

After $Q_n$ falls, $Q_{n+1}$ goes Hi at time t3, permitting read of signals from the photodiodes 22 in the (n+1)th row. Subsequently, the reset transistors 25 in the (n+1)th row are turned ON with the pixel reset pulse $RST_{n+1}$ to allow the photodiodes 22 in the (n+1)th row to be reset.

After $Q_{n+1}$ falls, $Q_{n+2}$ goes Hi at time t4, permitting read of signals from the photodiodes 22 in the (n+2)th row. The signals from the pixels 12 in the (n+1)th and (n+2)th rows as reading rows are sample-held, then selected every column with a column scanning circuit and output as the final output.

A feature of the drive by the solid-state imaging device of this embodiment is that the pulse width of the pixel reset pulses $RST_{n-1}$ and $RST_n$ applied to the thinning rows is made smaller than the pulse width of the pixel reset pulses $RST_{n+1}$ and $RST_{n+2}$ applied to the reading rows.

In this embodiment, by setting a small pulse width for the pixel reset pulse for a thinning row, it is possible to ensure insufficient release of charge from the photodiodes 22 in the thinning row. As a result, as in the solid-state imaging device of Embodiment 1, the state that charge partly remains in the photodiodes 22 in a thinning row after resetting can be obtained. Thus, it is possible to prevent the occurrence that charge accumulated in the photodiode 22 of a pixel 12 that has not been read during the thinning drive reaches a saturation charge amount and overflows into an adjacent photodiode 22 causing generation of a false signal. Moreover, the potential of the p-well in the imaging region 11 can be prevented from varying and stabilized. As a result, not only high-quality images hardly having smearing, blooming, color mixing or the like can be obtained, but also the time taken to perform read and reset operation can be shortened to allow high-speed thinning drive.

The drive timing shown in FIG. 16 can be implemented by controlling the pulse CLK and the like supplied from the control section 17 to the row scanning section 13, for example, to change the pulse width of the pulse RESET.

First Alteration to Embodiment 3

Figure 17:
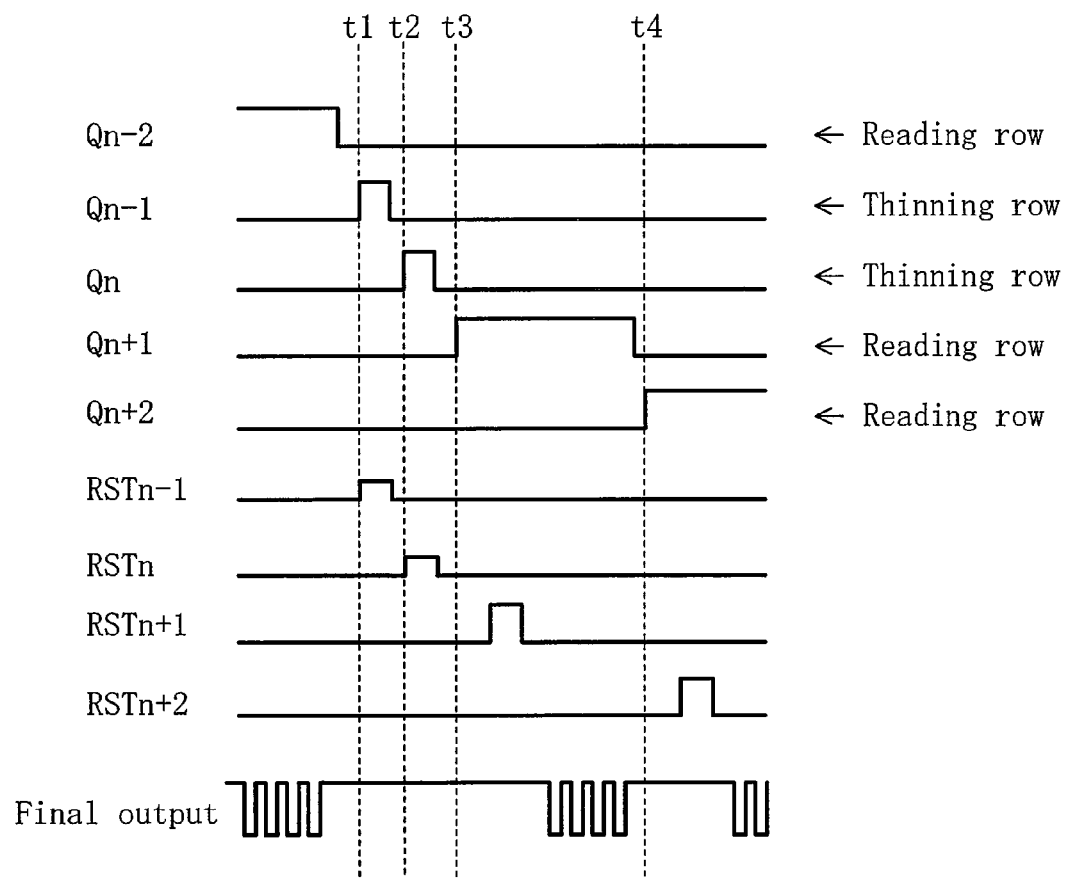
FIG. 17 is a timing chart showing thinning drive of a first alteration to the solid-state imaging device of Embodiment 3 of the present invention.

The first alteration to Embodiment 3 will be described with reference to FIG. 17. FIG. 17 shows the operation timing in a solid-state imaging device of this alteration.

As shown in FIG. 17, the solid-state imaging device of this alteration sets the pulse height of the pixel reset pulses $RST_{n-1}$ and $RST_n$ applied to the thinning rows to be smaller than the pulse height of the pixel reset pulses $RST_{n+1}$ and $RST_{n+2}$ applied to the reading rows. By reducing the pulse height, the drive voltage for the reset transistors 25 becomes low. In this way, the charge amount released from the photodiodes 22 can be reduced.

In the solid-state imaging device of this alteration, the signal generation timing from the control section 17 may be the same as that in the conventional case. No circuit change is therefore required. To change the pulse height at and from a specified row, however, it is necessary to provide a buffer circuit composed of an inverter circuit and the like individually in each output portion of the row scanning section 13 and change the power supply for the buffer circuit. Alternatively, the pulse height of the pulse RESET supplied from the control section 17 may be changed, and the signal having the changed pulse height may be selectively supplied.

Second alteration to Embodiment 3

Figure 18:
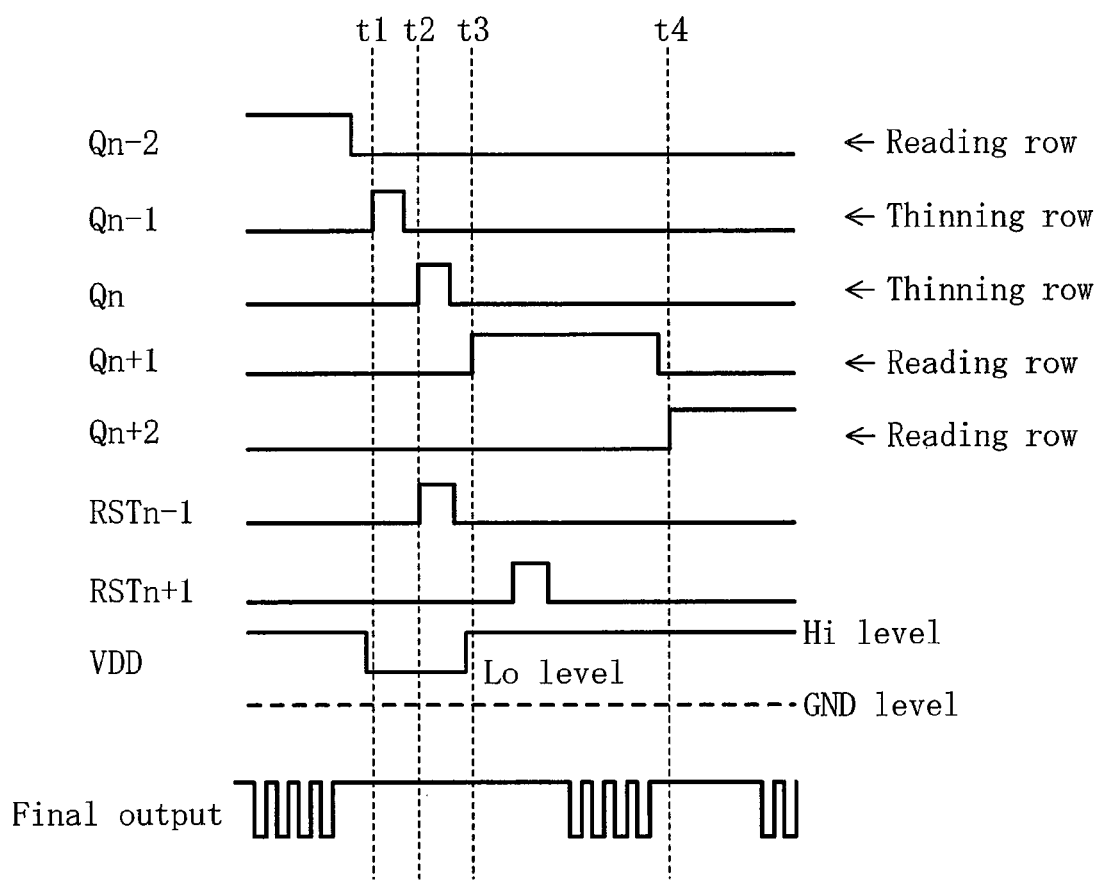
FIG. 18 is a timing chart showing thinning drive of a second alteration to the solid-state imaging device of Embodiment 3 of the present invention.

The second alteration to Embodiment 3 will be described with reference to FIG. 18. FIG. 18 shows operation timing in a solid-state imaging device of this alteration.

As shown in FIG. 18, in the solid-state imaging device of this alteration, the potential of the photodiodes in a thinning row is not reset to Hi potential at the time of selection of the thinning row in the thinning drive, but is fixed at Lo potential. Although the potential of the power supply $V_{DD}$ was set at a fixed potential in the solid-state imaging devices of Embodiment 3 and the first alteration to Embodiment 3, the power supply $V_{DD}$ is pulse-driven in this alteration. More specifically, the power supply $V_{DD}$ is set to be Lo potential at the time of selection of a thinning row. By setting in this way, the potential of the photodiodes 22 is not completely reset to the initial state, and thus, accumulated charge is incompletely released from the photodiodes 22 in thinning rows.

In this alteration, if the Lo potential of the power supply $V_{DD}$ is equal to the ground potential, charge will flow in reverse from the power supply $V_{DD}$ to the photodiodes 22 in each row. In consideration of this, the Lo potential of the power supply $V_{DD}$ must be a potential that is higher than the ground to such an extent as to cause no reverse flow to the photodiode 22.

Also, according to this alteration, no special circuit change or the like for changing the reset pulse width and the pulse height is required, and thus simplification of the circuit can be attained.

Embodiment 4

Figure 19:
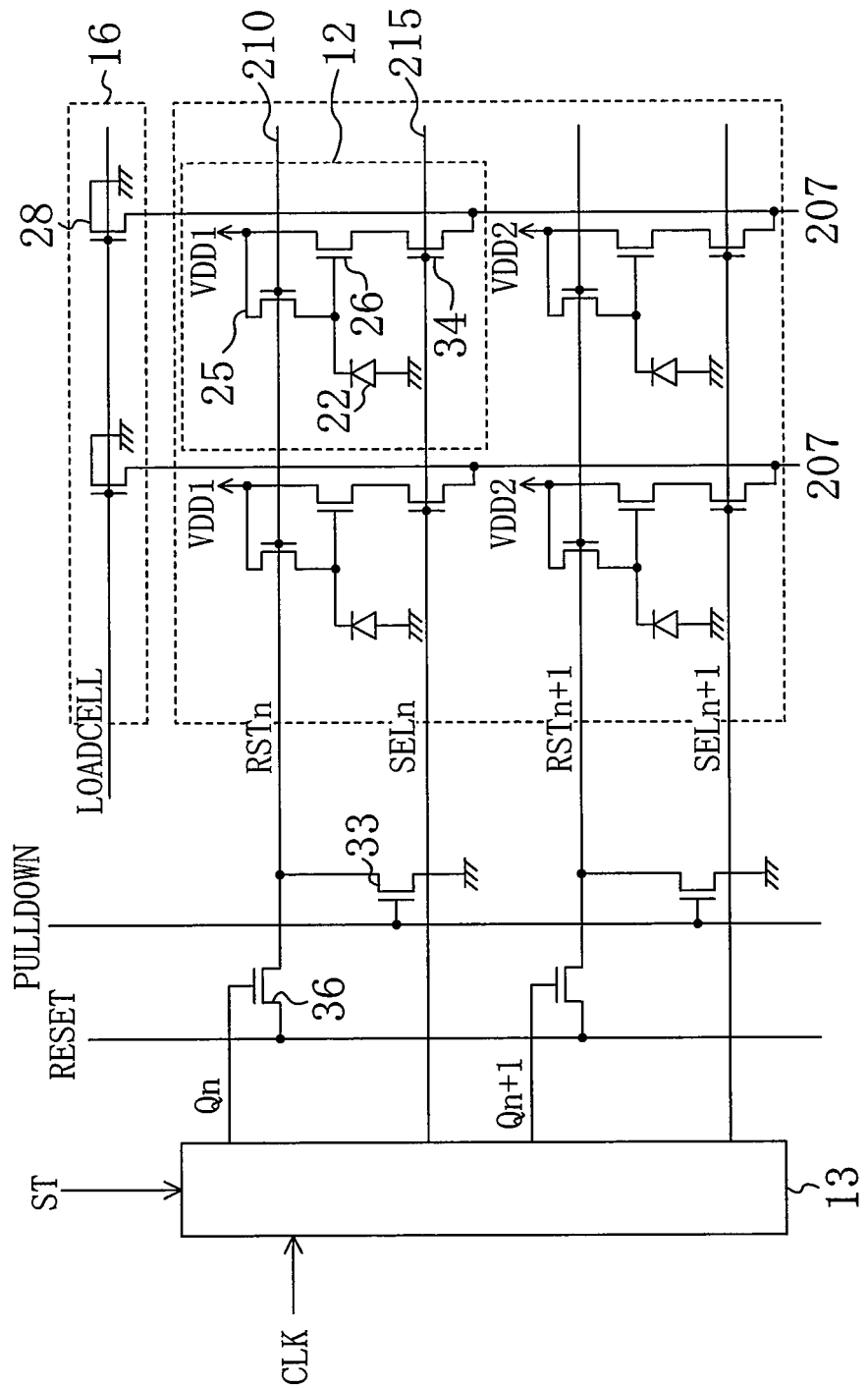
FIG. 19 is a circuit diagram showing a main portion of a solid-state imaging device of Embodiment 4 of the present invention.

Embodiment 4 of the present invention will be described with reference to the relevant drawings. FIG. 19 shows a circuit configuration of a main portion of a solid-state imaging device of Embodiment 4. In FIG. 19, the same components as those in FIG. 14 are denoted by the same reference numerals, and the description thereof is omitted here. The entire block configuration of the solid-state imaging device is the same as that of Embodiment 1.

As shown in FIG. 19, in the solid-state imaging device of this embodiment, the pixels 12 in thinning rows are connected to power supply $V_{DD1}$ while the pixels 12 in reading rows are connected to power supply $V_{DD2}$. A reset selection transistor 36 and a pull-down transistor 33 are provided for each row. The reset selection transistor 36 for the n-th row receives at its gate an output signal $Q_n$ from the shift register provided in the row scanning section 13 and receives at its drain the read reset pulse RESET supplied from the control section 17, to thereby supply a pixel reset pulse $RST_n$ for the n-th row to the pixel reset signal line 210 for the n-th row. The pull-down transistor 33 for the n-th row grounds the pixel reset signal line 210 for the n-th row with a pulse PULLDOWN input into its gate, to give the ground potential.

Figure 20:
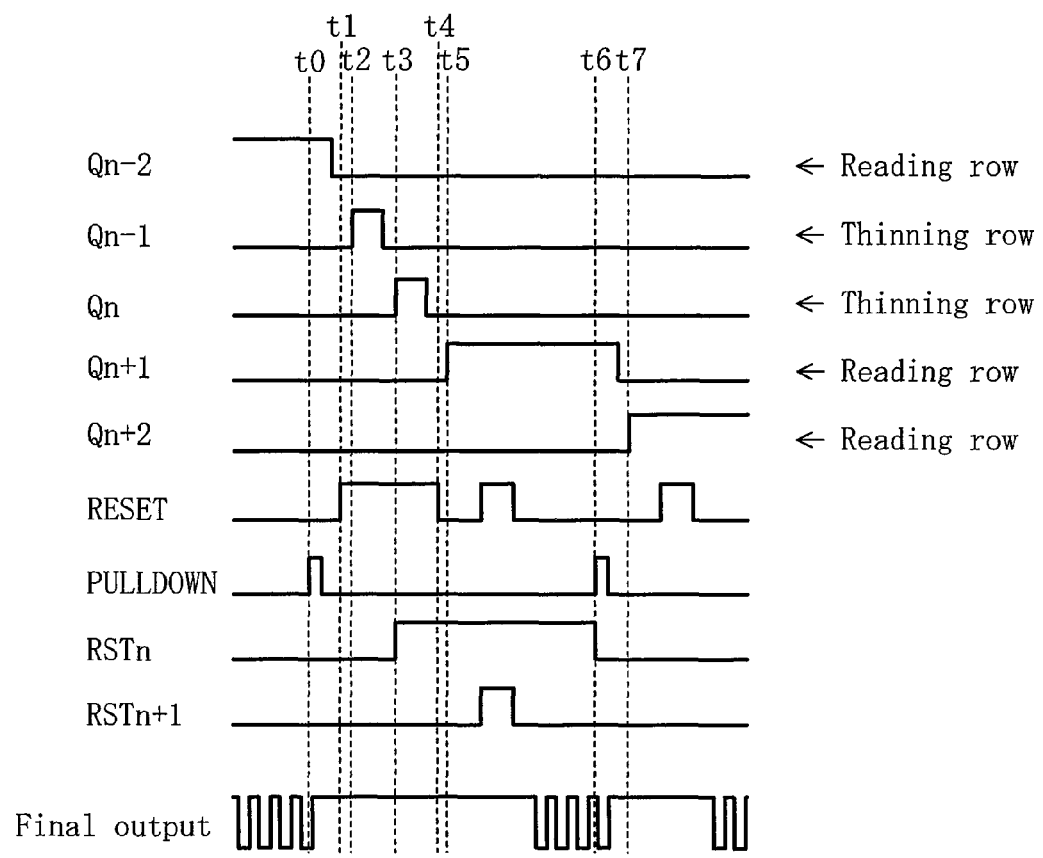
FIG. 20 is a timing chart showing thinning drive of the solid-state imaging device of Embodiment 4.

FIG. 20 shows operation timing of the solid-state imaging device of this embodiment. As shown in FIG. 20, at time t0, at which $Q_{n-2}$ is in Hi state selecting the (n−2)th row, the pulse PULLDOWN is applied to the pull-down transistors 33, turning the pixel reset signal lines 210 for all rows to the ground potential.

After the reset pulse RESET rises to Hi potential at time t1, $Q_{n-1}$ goes Hi at time t2 putting the (n−1)th row as a thinning row in the selected state. The reset selection transistor 36 for the (n−1)th row is turned ON, to permit the pixel reset pulse $RST_{n-1}$ for the (n−1)th row to be supplied to the pixel reset signal line 210 for the (n−1)th row, turning ON the reset transistors 25 in the (n−1)th row.

After $Q_{n-1}$ falls, $Q_n$ goes Hi at time t3 putting the n-th row as a thinning row in the selected state. At this time, since the reset pulse RESET is still in Hi potential, the pixel reset pulse $RST_n$ for the n-th row is output to the pixel reset signal line 210 for the n-th row.

Even though $Q_{n-1}$ falls turning OFF the reset selection transistor 36 for the (n−1)th row, the pixel reset signal line 210 for the (n−1)th row holds the Hi potential since the pull-down transistor 33 for the (n−1)th row is still in the OFF state. That is to say, charge is continuously released from the photodiodes 22 in the (n−1)th row during the time when charge is being released from the photodiodes 22 in the n-th row.

After $Q_n$ falls, the reset pulse RESET falls to Lo potential at time t4. By having such timing, the pixel reset signal lines 210 for the (n−1)th and n-th rows hold the Hi state even after the pulse RESET falls to Lo potential.

At time t5, $Q_{n+1}$ goes Hi allowing read of signals in the (n+1)th row. The reset pulse RESET then rises to Hi potential, to allow the pixel reset pulse $RST_{n+1}$ to be output to the pixel reset signal line 210 for the (n+1)th row, thereby resetting the photodiodes 22 in the (n+1)th row to the initial state. With the subsequent fall of the reset pulse RESET, signals after the resetting are read from the pixels 12 in the (n+1)th row.

The pulse PULLDOWN is then applied at time t6, and $Q_{n+1}$ falls putting the (n+1)th row in the non-selected state. With the pulse PULLDOWN, the pixel reset signal lines 210 for all rows are reset to the ground potential, and this terminates the signal release operation for the (n−1)th and n-th rows. In FIG. 20, only the pixel reset pulse $RST_n$ for the n-th row is shown. Although not shown, the pixel reset pulse $RST_{n-1}$ is in Hi potential from time t2 until time t6.

As shown in FIG. 20, for achievement of high-speed read, the row selection time period for a thinning row is set as short as possible. Therefore, it is difficult in some cases to apply the reset pulse to the thinning row within this time period. For this reason, circuit change for shortening pulses supplied to thinning rows may be necessary. With the device configuration and operation timing shown in this embodiment, however, such circuit change and the like for shortening the reset pulse are no more necessary.

In this embodiment, if the power supply $V_{DD1}$ for thinning rows holds Hi potential, charge may possibly be released completely from the photodiodes 22 in thinning rows. To avoid this occurrence, the power supply $V_{DD1}$ is preferably set at Lo potential to control the signal release amount. In the second alteration to Embodiment 3 described above, in which the accumulated charge is released with the power supply $V_{DD}$ set at Lo potential, it may be difficult in some cases to release a desired charge amount if the pulse width of the reset pulse is extremely small. This problem can be solved by delaying the fall of the reset pulse for a thinning row by one horizontal time period to thereby secure a long charge release time for the thinning row, as shown in this embodiment.

Embodiment 5

Figure 21:
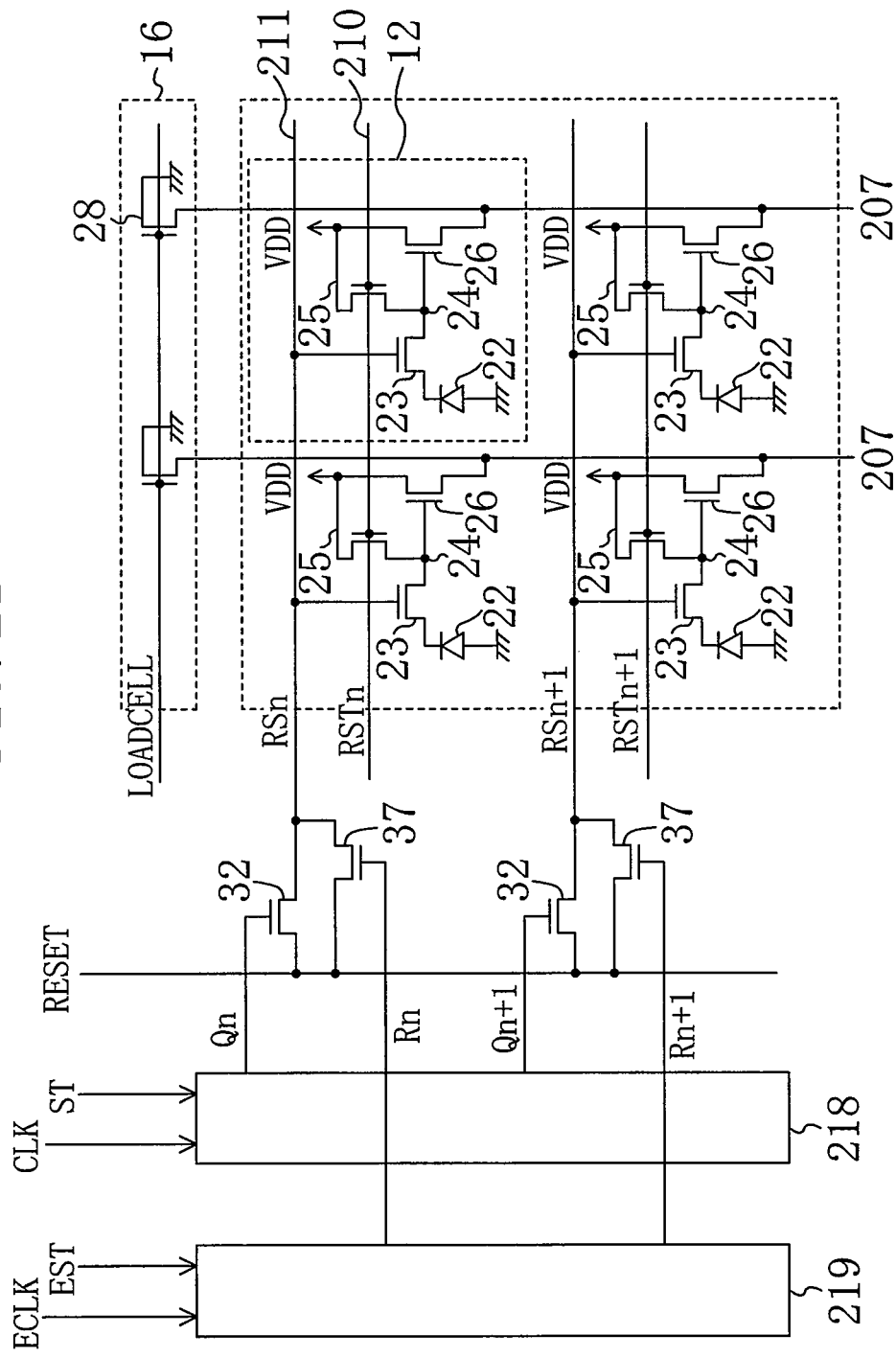
FIG. 21 is a circuit diagram showing a main portion of a solid-state imaging device of Embodiment 5 of the present invention.

Embodiment 5 of the present invention will be described with reference to the relevant drawings. FIG. 21 shows a circuit configuration of a main portion of a solid-state imaging device of Embodiment 5. In FIG. 21, the same components as those in FIG. 2 are denoted by the same reference numerals, and the description thereof is omitted here. The entire block configuration of the solid-state imaging device is the same as that of Embodiment 1.

As shown in FIG. 21, in the solid-state imaging device of this embodiment, the row scanning section 13 includes a signal read scanning circuit 218 and an electronic shutter scanning circuit 219. The signal read scanning circuit 218 generates a signal read signal $Q_n$ in response to the start pulse ST and the clock pulse CLK and outputs the signal $Q_n$. The electronic shutter scanning circuit 219 generates an electronic shutter drive signal $R_n$ in response to an electronic shutter start pulse EST and an electronic shutter clock pulse ECLK and outputs the signal $R_n$. The pulses ST, CLK, EST and ECLK are supplied from the control section 17.

The read selection transistor 32 for the n-th row receives the signal $Q_n$ at its gate and the read pulse READ at its drain, to thereby output a pulse $RS_n$, which is to be a read signal or a charge release signal for the n-th row, to the transfer signal line 211. The electronic shutter selection transistor 37 for the n-th row receives the signal $R_n$ at its gate and the read pulse READ at its drain, to thereby output the pulse $RS_n$, which is to be an electronic shutter signal for the n-th row, to the transfer signal line 211.

Figure 22:
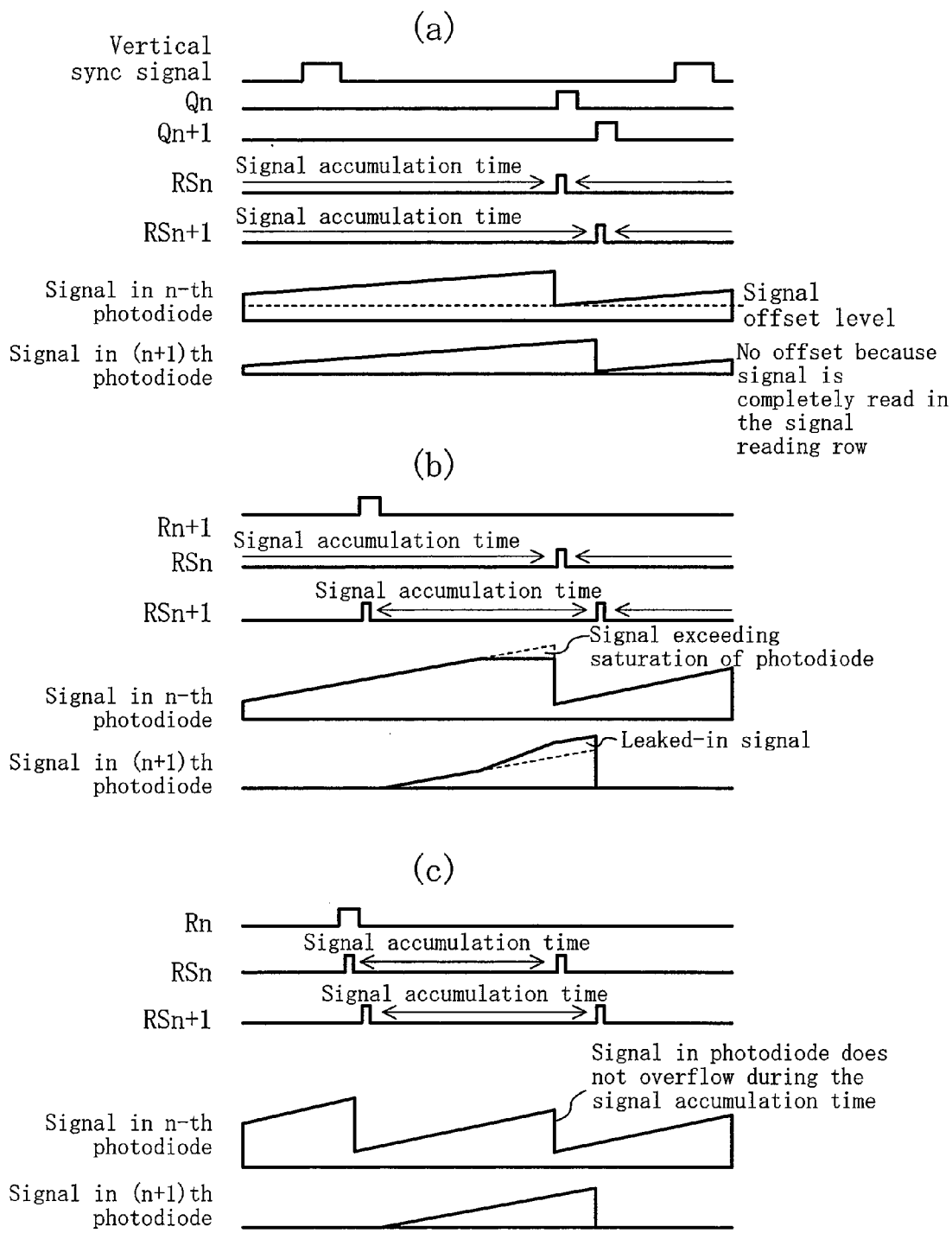

FIGS. 22A to 22C show operation timing of the solid-state imaging device of this embodiment, as well as charge accumulated in photodiodes, in which FIG. 22A shows the case of operation under low illumination, FIG. 22B shows the case of conventional thinning drive under high illumination, and FIG. 22C shows the case of the thinning drive in this embodiment under high illumination. In the following description, assume that the n-th row is a thinning row and the (n+1)th row is a reading row.

First, as shown in FIG. 22A, no electronic shutter operation is performed under low illumination. The pulse $RS_n$ as the charge release signal is applied to the transfer signal line 211 for the n-th row as a thinning row in synchronization with the signal $Q_n$, to allow part of charge accumulated in the photodiodes 22 to be released. Due to the low illumination, the charge in the photodiodes 22 in the n-th row does not reach the saturation amount within the charge accumulation time, and thus there is no leakage of a signal into the photodiodes 22 in the (n+1)th row as an adjacent reading row.

Under high illumination, in the case of the conventional electronic shutter operation, as shown in FIG. 22B, the pulse $RS_{n+1}$ as the electronic shutter signal is applied to the transfer signal line 211 for the (n+1)th row as a reading row in synchronization with the electronic shutter drive signal $R_{n+1}$, to allow the photodiodes 22 in the (n+1)th row to be reset. After the resetting, charge is accumulated in the photodiodes 22 in the (n+1)th row until the pulse $RS_{n+1}$ as the read signal is applied again in synchronization with the signal read signal $Q_{n+1}$. In this way, the time period during which charge is accumulated in the photodiode 22 in each pixel can be limited to a fixed time. The electronic shutter signal is input at such timing as to prevent accumulated charge in the photodiodes 22 from being saturated.

However, conventionally, the electronic shutter signal is not given to the photodiodes 22 in the n-th row as a thinning row because no signal read is performed and the row selection time is short. Therefore, if the pulse $RS_n$ as the charge release signal for the photodiodes 22 in the n-th row is input at timing as shown in FIG. 20B, the charge accumulation time will be long in the photodiodes 22 in the n-th row compared with the photodiodes 22 in the (n+1)th row for which the electronic shutter operation is performed. Therefore, the photodiodes 22 in the n-th row may reach the saturation charge amount before the pulse $RS_n$ as the charge release signal for the n-th row is applied, and as a result, a signal may possibly leak into the photodiodes 22 in the (n+1)th row as a reading row.

In the case of the solid-state imaging device of this embodiment shown in FIG. 22C, the pulse $RS_n$ as the charge release signal for the n-th row to be thinned is output in synchronization with the electronic shutter drive signal $R_n$. Therefore, the charge accumulation time of the photodiodes 22 in the n-th row is roughly equal to that of the photodiodes 22 in the (n+1)th row. Since the charge accumulation time in reading rows is set so as not to allow saturation of the photodiodes 22, the photodiodes 22 in the n-th row will not reach the saturation charge amount, either. As a result, as shown in FIG. 22C, no signal overflowing occurs and thus high-quality images hardly causing smearing, blooming, color mixing or the like are obtained.

Embodiment 6

Figure 23:
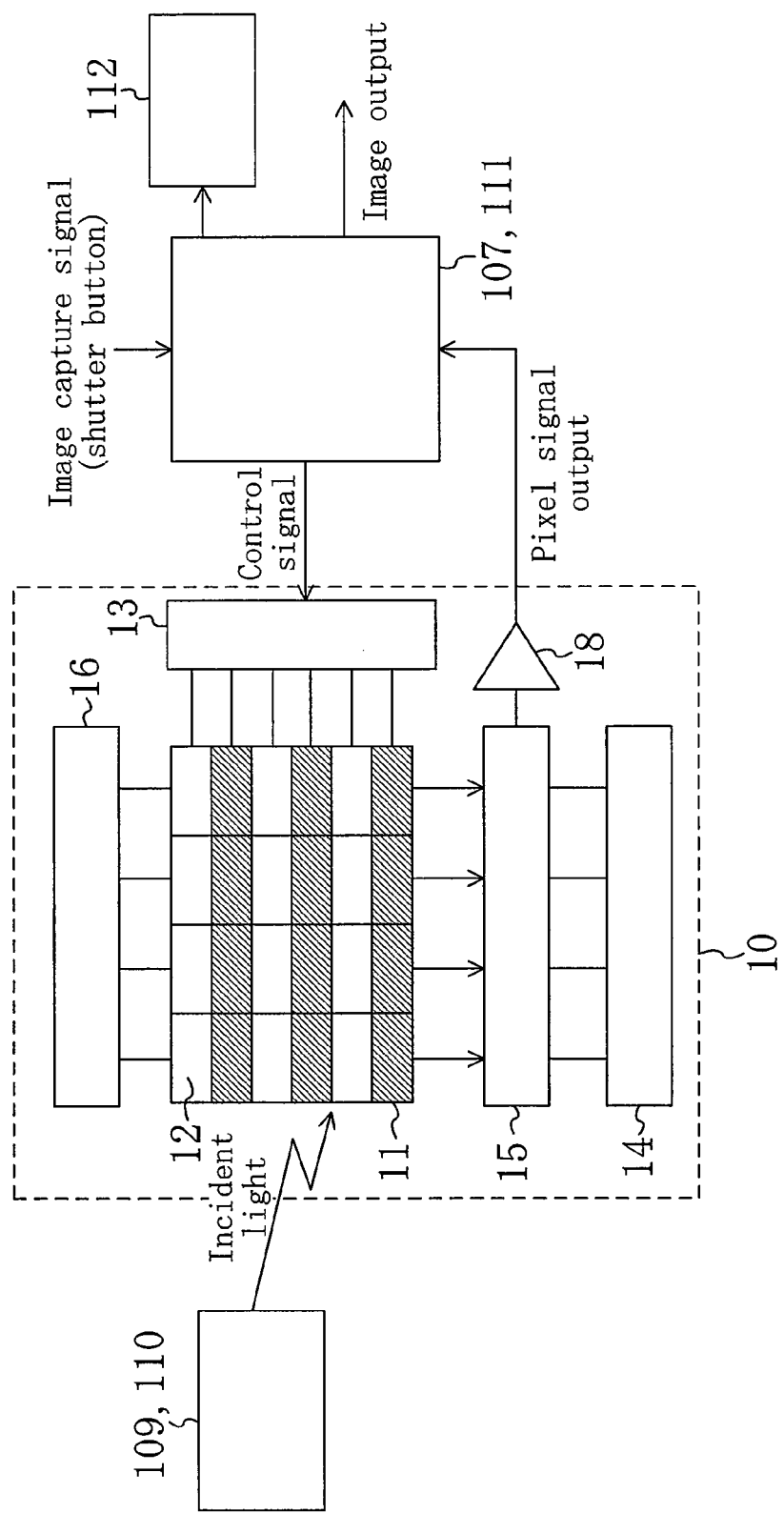
FIG. 23 is a block diagram showing an imaging apparatus of Embodiment 6 of the present invention.

Embodiment 6 of the present invention will be described with reference to FIG. 23. FIG. 23 shows a circuit configuration of an imaging apparatus of Embodiment 6. In FIG. 23, the same components as those in FIG. 1 are denoted by the same reference numerals, and the description thereof is omitted here.

As shown in FIG. 23, the imaging apparatus of this embodiment includes: the solid-state imaging device 10 of Embodiment 1; an optical system 109 such as a lens for allowing light to be incident to the imaging region and a mechanical shutter 110 for shutting light and the like; and the control section 17 and a signal processing circuit 111 for processing pixel signals from the amplifier 18.

The output signal from the signal processing circuit 111 is output to a monitor screen 112 or output as image data. The control section 17 and the signal processing circuit 111 may be integrated. The control circuit outputs, not only the signals for controlling the row scanning section 13, but also signals for controlling the column scanning circuit 14.

The solid-state imaging device 10 of this embodiment may be any of the solid-state imaging devices described as Embodiments 1 to 5 and the alterations to these embodiments.

The operation of the imaging apparatus of this embodiment will be described. The imaging apparatus is configured to permit switching between all-pixel read (still-picture imaging drive) and thinning drive (monitor drive). The imaging apparatus checks pixel signal outputs in the thinning drive (monitor drive), and determines imaging conditions such as the electronic shutter speed for obtaining the optimum exposure time and white balance, to adopt the determined conditions for the all-pixel read.

During the still-picture imaging, the imaging conditions for the all-pixel drive are determined based on the imaging conditions determined during the thinning drive for acquiring a monitor image for the still-picture imaging, to take a still picture in the all-pixel drive with an image capture signal.

In normal use, the imaged state is displayed on a liquid crystal screen or the like in the thinning (monitoring) drive, and the shutter button of the camera is pressed accepting the object and imaging conditions determined in the monitoring drive, to thereby take an all-pixel still picture. Therefore, if a signal overflows to a pixel in a reading row during the thinning drive, the output will be apparently high only during the thinning drive, and thus the imaged state of a still picture during the next all-pixel drive will be different from the state obtained when there is no signal overflowing. This causes such problems that the captured still image is darkened and that color displacement occurs if the overflow amount differs among pixels of different colors in the case of a color solid-state imaging device. However, in the imaging apparatus of this embodiment, there is no signal overflowing from a thinning row into an adjacent reading row during the thinning drive. Therefore, the quality of a still picture can be stabilized at a high level even when still-picture imaging and moving-picture imaging for monitoring are performed repeatedly. Also, since a high frame rate can be secured in the thinning drive, the monitor imaging time can be shortened. Moreover, the quality of moving pictures can be widely improved.

Although the operation in still-picture imaging was not described in detail in Embodiments 1 to 6, the conventional interlace scanning or progressive scanning may be adopted for the still-picture imaging. Although the 2-row thinning (two lows are read and then two rows are thinned) was exemplified to describe Embodiments 1 to 5, the pixel thinning method is not limited to the embodiments described above. In a solid-state imaging device having known Bayer-pattern color filters, however, color reproducibility and high-speed read can be secured simultaneously by adopting this method.

In Embodiments 1 to 6, the control section (circuit) 17 and the signal processing circuit 111 were placed outside the solid-state imaging device 10. Alternatively, either one or both of them may be placed inside the solid-state imaging device 10. With this, the entire configuration can be made small.

The timing relationship between the signal release pulse for thinning rows and the electronic shutter pulse for reading rows described in Embodiment 5 can also be applied to the configuration of Embodiment 3. In this case, the timing may be adjusted between the reset pulse, in place of the signal release pulse, and the electronic shutter pulse.

INDUSTRIAL APPLICABILITY

According to the present invention, a solid-state imaging device having a high frame rate in which the potential of the p-well is prevented from varying during thinning drive and thus the read and reset operation is shortened can be implemented, and such a device is useful as a solid-state imaging device for high-speed moving-picture imaging.

The invention claimed is:
1. A solid-state imaging device comprising:
a plurality of pixels each of which is two-dimensionally arranged on a semiconductor substrate and comprises a photoelectric conversion portion configured to convert a light signal to signal charge, a read portion configured to transfer the signal charge generated in the photoelectric conversion portion to a floating diffusion, an output portion configured to output the signal charge of the floating diffusion after amplification, and an initializing portion configured to discharge the signal charge of the floating diffusion; and
a scanning section for selectively outputting a drive signal to each of the plurality of pixels,
wherein during the operation of reading signals from pixels included in a first pixel group of the plurality of pixels and skipping the reading of signals from pixels included in a second pixel group,
the read portion transfers signal charge of a photoelectric conversion portion of the pixel included in the first pixel group until the signal charge reaches a first level, and
the read portion transfers signal charge of a photoelectric conversion portion of the pixel included in the second pixel group until the signal charge reaches a second level, the second level being different from the first level.

2. The solid-state imaging device of claim 1, wherein a period of time for the read portion to transfer the signal charge of the photoelectric conversion portion of the pixel included in the second pixel group is shorter than a period of time for the read portion to transfer the signal charge of the photoelectric conversion portion of the pixel included in the first pixel group.

3. The solid-state imaging device of claim 2, wherein the period of time to transfer the signal charge of the photoelectric conversion portion of tile pixel included in the second pixel group is the shortest period of time determined by a reference clock.

4. The solid-state imaging device of claim 1, wherein a drain voltage applied to the read portion to transfer the signal charge of the photoelectric conversion portion of the pixel included in the second pixel group is lower than a drive voltage applied to the transfer portion to read the signal charge of the photoelectric conversion portion of the pixel included in the first pixel group.

5. The solid-state imaging device of claim 1, wherein a drain voltage applied to the read portion to transfer the signal charge of the photoelectric conversion portion of the pixel included in the second pixel group is lower than a drain voltage applied to the read portion to transfer the signal charge of the photoelectric conversion portion of the pixel included in the first pixel group.

6. The solid-state imaging device of claim 1, further comprising holding means for holding a drive signal for transferring the signal charge of the photoelectric conversion portion of the pixel included in the second pixel group for a certain period of time.

7. An imaging apparatus comprising:
a solid-state imaging device of claim 1;
an optical system for allowing light to be incident to the solid-state imaging device;
a control section for outputting a control signal for controlling operation of the solid-state imaging device; and
a signal processing circuit for processing an output signal from the solid-state imaging device and outputting the results as moving picture data or still picture data.

8. The imaging apparatus of claim 7, further comprising a shutter for shutting light from being incident to the solid-state imaging device.

9. The imaging apparatus of claim 7, further comprising a monitor screen for monitoring the data.

10. The imaging apparatus of claim 7, wherein at least one of the control section and the signal processing circuit is placed inside the solid-state imaging device.

* * * * *